(12) United States Patent
Middleton

(10) Patent No.: US 11,871,769 B2
(45) Date of Patent: Jan. 16, 2024

(54) MODULAR SMOKER

(71) Applicant: MIDDLETON MIXOLOGY LLC, Everett, WA (US)

(72) Inventor: James Dean Middleton, Everett, WA (US)

(73) Assignee: MIDDLETON MIXOLOGY LLC, Everett, WA (US)

( * ) Notice: Subject to any disclaimer, the term of this patent is extended or adjusted under 35 U.S.C. 154(b) by 0 days.

(21) Appl. No.: 17/878,643

(22) Filed: Aug. 1, 2022

(65) Prior Publication Data

US 2022/0361543 A1 Nov. 17, 2022

Related U.S. Application Data

(63) Continuation-in-part of application No. 17/162,822, filed on Jan. 29, 2021.

(60) Provisional application No. 62/967,081, filed on Jan. 29, 2020.

(51) Int. Cl.
| | |
|---|---|
| *A23L 27/27* | (2016.01) |
| *C12G 3/07* | (2006.01) |
| *A23B 4/052* | (2006.01) |
| *F23B 80/04* | (2006.01) |

(52) U.S. Cl.
CPC .............. *A23L 27/27* (2016.08); *A23B 4/052* (2013.01); *C12G 3/07* (2019.02); *F23B 80/04* (2013.01)

(58) Field of Classification Search
CPC . A23B 4/052; A23L 27/27; C12G 3/07; F23B 80/04
USPC .......................................................... 99/482
See application file for complete search history.

(56) References Cited

U.S. PATENT DOCUMENTS

| | | | | |
|---|---|---|---|---|
| 2019/0320712 | A1* | 10/2019 | Rix | A24F 1/30 |
| 2019/0364960 | A1* | 12/2019 | Nguyen | A24F 1/30 |
| 2019/0387789 | A1* | 12/2019 | Mehio | A24F 1/30 |

OTHER PUBLICATIONS

Extended European Search Report dated May 31, 2021 in corresponding European Application No. 21154427.5, 6 pages.

* cited by examiner

*Primary Examiner* — Dana Ross
*Assistant Examiner* — Joseph W Iskra
(74) *Attorney, Agent, or Firm* — MH2 TECHNOLOGY LAW GROUP LLP

(57) ABSTRACT

A modular smoker includes a base portion having a through bore extending from a first end of the base portion to a second end of the base portion, wherein the through bore is configured to define a shelf between the first end and the second end, a top portion configured to be removably coupled with the base portion, wherein the top portion has a through bore extending from a first end of the top portion to an opposite second end of the top portion in a first direction, and a screen configured to be held on the shelf of the through bore between the first end and the second end of the base portion. The through bore of the base portion is configured to define a chamber for receiving a combustible material on the screen between the first end and the second end of the base portion, the through bore of the base portion is configured to permit a flow of smoke from the combustible material out the through bore of the base portion at the second end of the base portion, and the second end of the body member is configured to rest on a rim of a container to block the flow of air from the container where a surface of the second end of the body member contacts the rim.

27 Claims, 28 Drawing Sheets

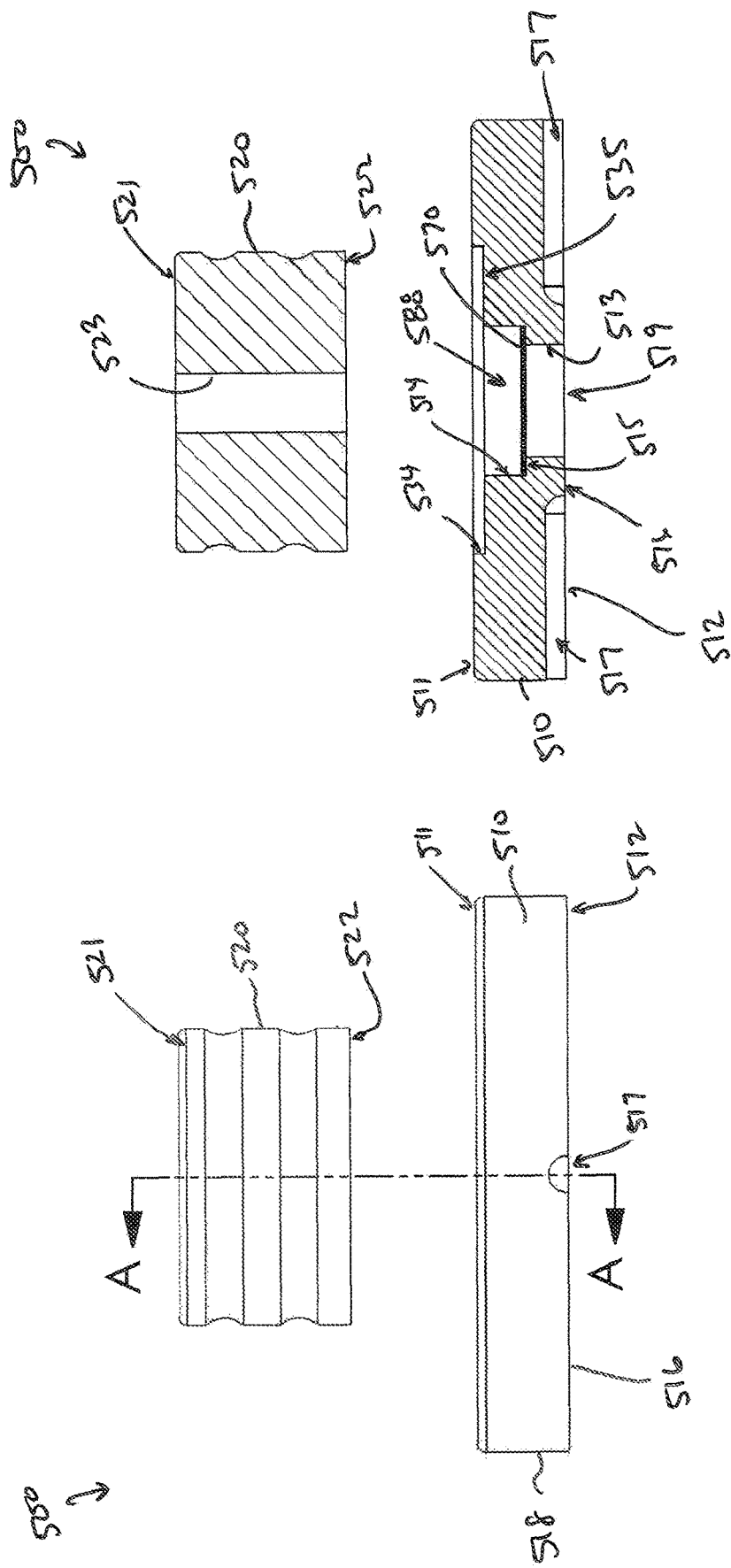

MODULAR SMOKER

CROSS-REFERENCE TO RELATED APPLICATIONS

This application is a continuation-in-part of U.S. application Ser. No. 17/162,822, filed Jan. 29, 2021, pending, which claims the benefit of U.S. Provisional Application No. 62/967,081, filed Jan. 29, 2020, the disclosures of which are hereby incorporated by reference herein in their entirety.

BACKGROUND

Adding smoke to a cocktail or food adds a layer of complexity to the flavor and/or aroma of the cocktail or food. When smoke is introduced into a cocktail glass or other container, the smoke comes in contact with the glass and contents (e.g., ice and liquid) of the glass. The molecules in the smoke, except for the tar and carbon particles, dissolve in moisture on the glass and contents, thereby imparting the smell and taste of the smoke to the eventual cocktail. For example, the film of water on the surface of an ice cube attracts and bonds to the smoke. The smoke will then infuse the cocktail giving it a smoky flavor with real smoke.

A conventional type of smoker comprises a glass dome or enclosed smokebox that will hold smoke introduced from a handheld smoke generator, for example, a smoke gun. The smoke generator typically includes a chamber for receiving wood chips and shavings. The smoke generator can be powered by electric current to create heat sufficient to burn the wood chips, thereby generating smoke. The smoke is typically directed onto the food or drink, and the glass dome is placed over the smoke and food/drink to allow the smoke to infuse into the food or drink.

Another conventional type of smoker comprises a wood plank that can be positioned adjacent a drink or food. The wood plank is lit on fire with a lighter, and a glass cover is placed over the burning section of the wood plank with the lip of the cover facing downward so that the cover collects the smoke for infusing the drink or food.

However, the aforementioned conventional smokers have a number of disadvantages. For example, they occupy a significant amount of space, which is undesirable in a kitchen or bar. They also require multiple parts to be moved, which could lead to the loss of smoke. Also, electric smokers require batteries. The conventional smokers infuse an area and the smoke is only indirectly received by the drink or food, which imparts less flavor and aroma to the drink or food. Conventional smokers do not provide a flow path for air in a container to escape to ambient when smoke is introduced into the container. Also, some conventional smokers are not configured to prevent embers from escaping a chamber of the smoker.

Accordingly, it may be desirable to provide a smoker that overcomes one or more of the above disadvantages of conventional smokers.

SUMMARY

According to various aspects of the disclosure, a modular smoker for infusing smoke into flavor and/or taste of a beverage or food, the modular smoker includes a base portion having a through bore extending from a first end of the base portion to a second end of the base portion, wherein the through bore is configured to define a shelf between the first end and the second end, a top portion configured to be removably coupled with the base portion, wherein the top portion has a through bore extending from a first end of the top portion to an opposite second end of the top portion in a first direction, and a screen configured to be held on the shelf of the through bore between the first end and the second end of the base portion. The through bore of the base portion is configured to define a chamber for receiving a combustible material on the screen between the first end and the second end of the base portion, the through bore of the base portion is configured to permit a flow of smoke from the combustible material out the through bore of the base portion at the second end of the base portion, and the second end of the body member is configured to rest on a rim of a container to block the flow of air from the container where a surface of the second end of the body member contacts the rim.

In some aspects of the modular smoker, the base portion includes a groove in the surface of the second end, wherein the groove extends in a second direction perpendicular to the first direction of the through bore from an outer periphery of the second end to a position spaced from the through bore of the base portion, and the second end of the bottom is sized and configured to be placed on the rim of the container such that the groove crosses the rim of the container to permit air to flow from inside the container to outside the container via the groove.

According to various aspects of the disclosure, a smoker configured to infuse smoke into flavor and/or taste of a beverage or food includes a body member having a through bore extending from a first end of the body member to an opposite second end of the body member in a first direction and an insert configured to be received in the through bore at the first end and retained by the through bore at a position between the first end and the second end. The through bore and the insert are configured to define a chamber for receiving a combustible material between the insert and the first end, the through bore is configured to permit a flow of smoke from the combustible material out the through bore at the second end of the body member, and the second end of the body member is configured to rest on a rim of a container to block the flow of air from the container where a surface of the second end of the body member contacts the rim.

In some aspects of the aforementioned smoker, the through bore includes a first bore portion adjacent the first end of the body member and a second bore portion adjacent the second end of the body member, and the first bore portion has an inside diameter that is greater than an inside diameter of the second bore portion.

In various aspects of the aforementioned smokers, an interface of the first bore portion and the second bore portion defines a shoulder configured to retain the insert in the first bore portion.

In some aspects of the aforementioned smokers, the inside diameter of the second bore portion is smaller than an outside diameter of the insert such that the second bore portion is configured to prevent the mesh insert from passing into the second bore portion.

In various aspects of the aforementioned smokers, the body member includes a groove in the surface of the second end, and the groove extends in a second direction perpendicular to the first direction of the through bore from an outer periphery of the second end to a position spaced from the through bore.

In some aspects of the aforementioned smokers the body member includes two grooves in the surface of the second end, and the grooves extend in a second direction perpendicular to the first direction of the through bore from an outer periphery of the second end to positions spaced from the through bore.

In various aspects of the aforementioned smokers, the second end of the body member is sized and configured to be placed on the rim of the container such that each groove crosses the rim of the container to permit air to flow from inside the container to outside the container via each groove.

In some aspects, the aforementioned smoker may further include a cylinder configured to be inserted into the through bore at a first end of the body member, wherein the cylinder is configured to receive the insert such that the insert and the cylinder define a chamber in the through bore adjacent the first end of the body member. In various aspects, the smoker further comprises a washer configured to slidingly receive the cylinder and to abut the first end of the body member. In some aspects, the cylinder includes a lip configured to engage the washer and prevent the cylinder from sliding completely through the washer.

In various aspects of the aforementioned smokers, the through bore includes a first bore portion adjacent the first end of the body member and a second bore portion adjacent the second end of the body member, the first bore portion has an inside diameter that is greater than an inside diameter of the second bore portion such that the cylinder is configured to be disposed in the first bore portion, and the second bore portion is configured to prevent the cylinder from entering the second bore portion.

In some aspects of the aforementioned smokers, the inside diameter of the second bore portion is smaller than an outside diameter of the insert such that the second bore portion is configured to prevent the mesh insert from passing into the second bore portion.

In various aspects of the aforementioned smokers, the body member includes a groove in a surface of the first end that insects with an exit through bore extending from the first end of the body member to the second end of the body member in the first direction, and the groove extends in a second direction perpendicular to the first direction of the exit through bore from the exit through bore to an outer periphery of the first end of the body member.

In some aspects of the aforementioned smokers, the body member includes two grooves in a surface of the first end and two exit through bore extending from the first end of the body member to the second end of the body member in the first direction, and each of the grooves intersects with a respective one of the exit through bores and extends in a second direction perpendicular to the first direction from the respective exit through bore to an outer periphery of the first end of the body member.

In various aspects, any of the preceding smokers may further include a lid configured to be placed on a surface of the first end of the body member to cover the through bore so as to block the flow of air from the container via the through bore.

BRIEF DESCRIPTION OF THE DRAWINGS

Features and advantages of the present disclosure are described in, and will be apparent from, the following Brief Description of the Drawings and Detailed Description.

FIG. 18 is an exploded side view of a fourth exemplary embodiment of the smoker of FIG. 1 in a partially assembled configuration.

FIG. 19 is a side cross-sectional view of the partially assembled smoker of FIG. 18.

DETAILED DESCRIPTION OF EMBODIMENTS

As a preface to the detailed description, it should be noted that, as used in this specification and the appended claims, the singular forms "a," "an," and "the" include plural referents, unless the context clearly dictates otherwise.

Figure 1:
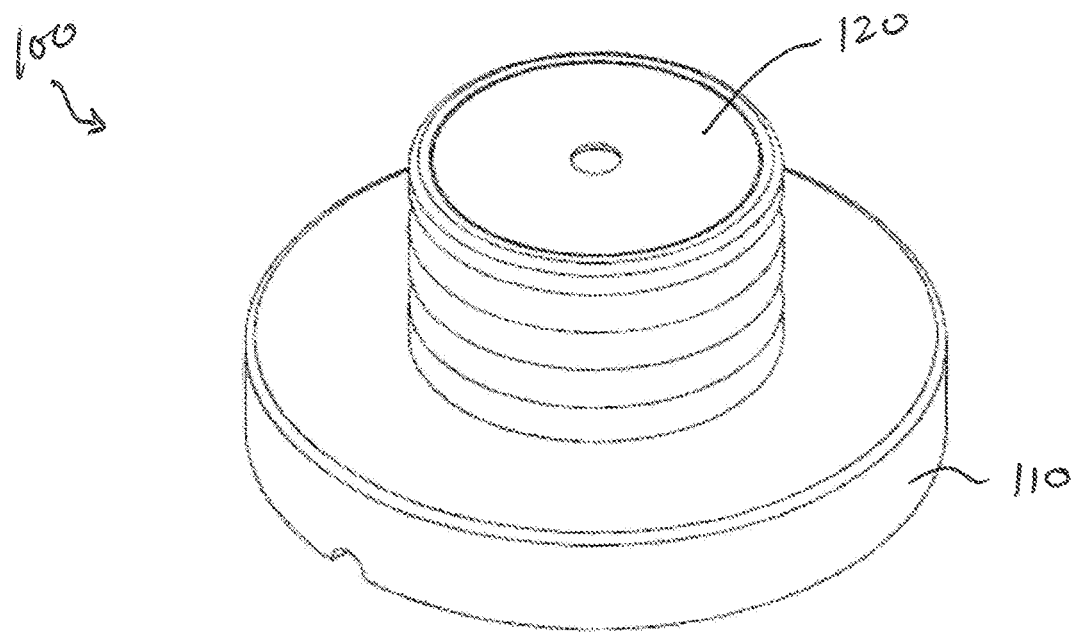
FIG. 1 is a front perspective view of an exemplary smoker in accordance with various aspects of the disclosure
Figure 2:
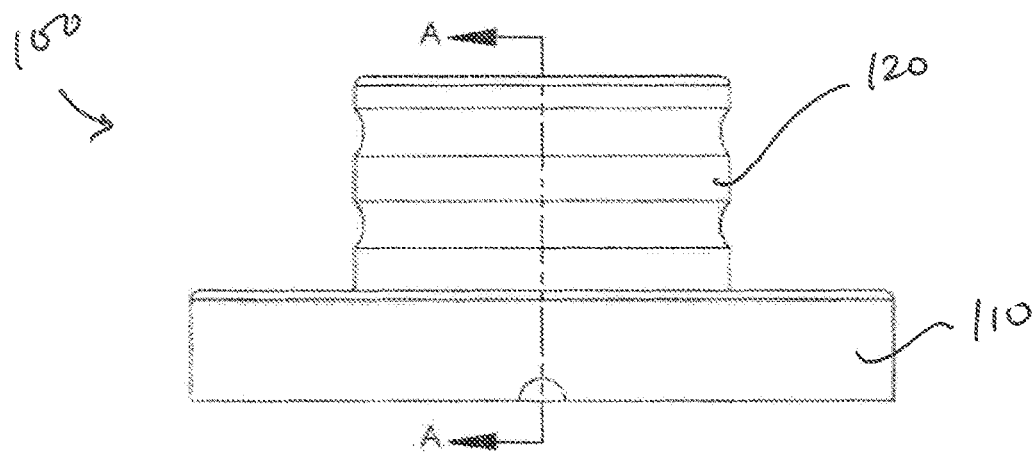
FIG. 2 is a side view of the smoker of FIG. 1.
Figure 2A:
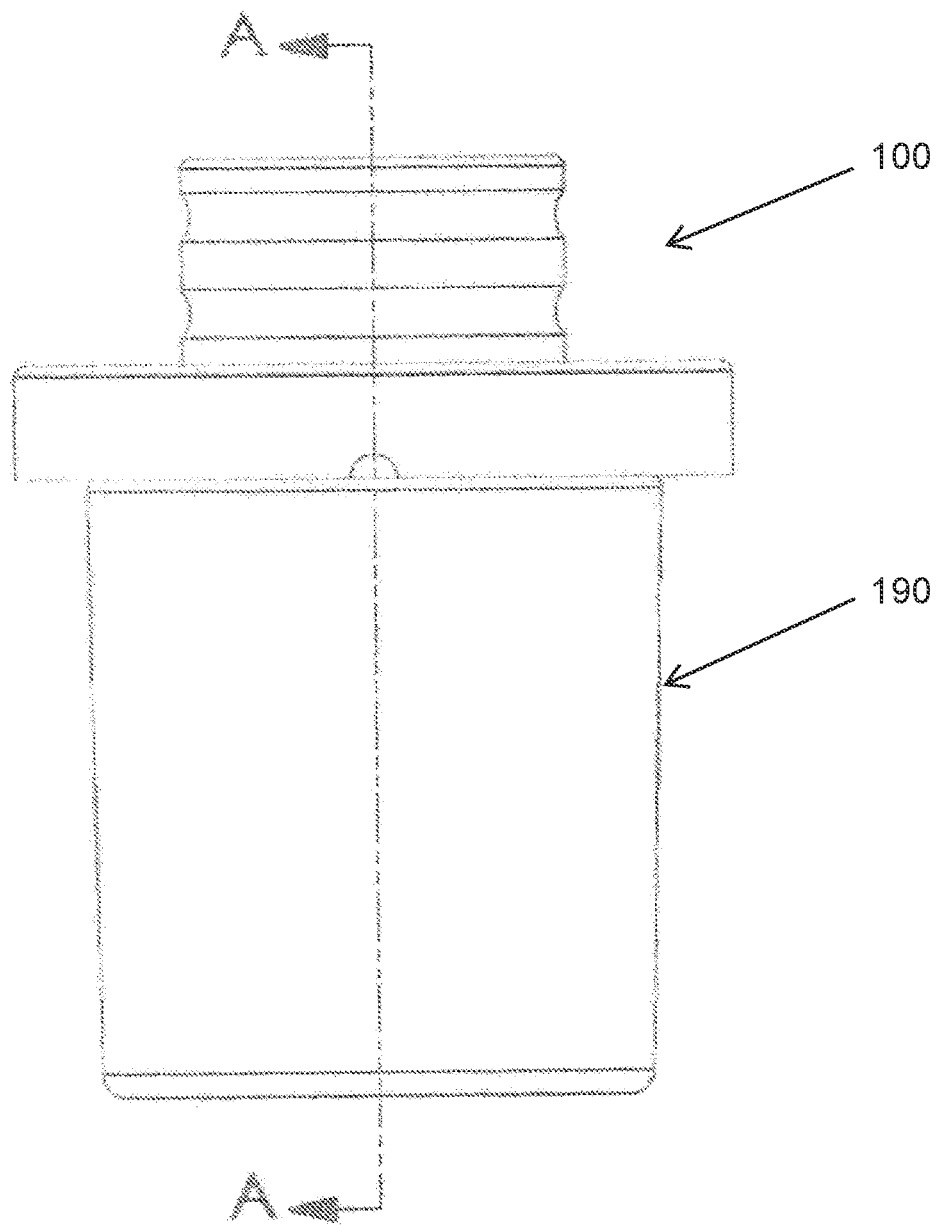
FIG. 2A is a side view of the smoker of FIG. 1 resting on a container.

Referring to the drawings, FIGS. 1 and 2 generally depict a smoker 100 in accordance with various exemplary embodiments of the disclosure. FIG. 2A depicts the smoker 100 resting on a container 190. The smoker 100 includes a base portion 110 and a top portion 120. As described in the exemplary embodiments below, the base portion 110 and the top portion 120 are separate structures that be selectively mated together and separated from one another, as will be described with respect to the various exemplary embodiments disclosed below. The base portion 110 and the top portion 120 may be wood or any food grade material that can withstand the heat generated by, for example, a torch lighter that is used to burn wood chips that are placed in a chamber of the base portion 110 and/or the base portion 120 and are ignited by the torch lighter, as discussed in more detail below.

Figure 3:
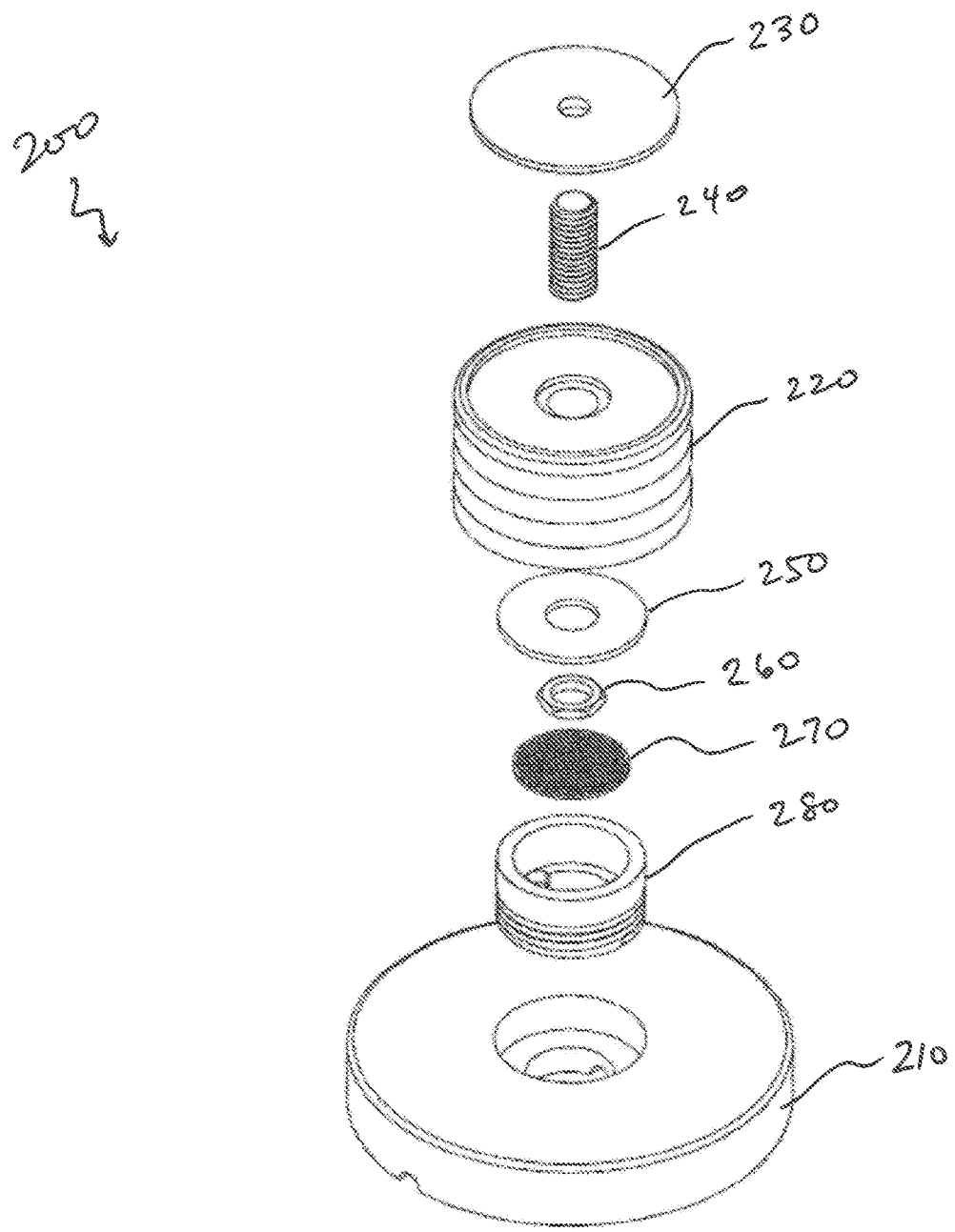
FIG. 3 is an exploded top, front perspective view of a first exemplary embodiment of the smoker of FIG. 1.
Figure 4:
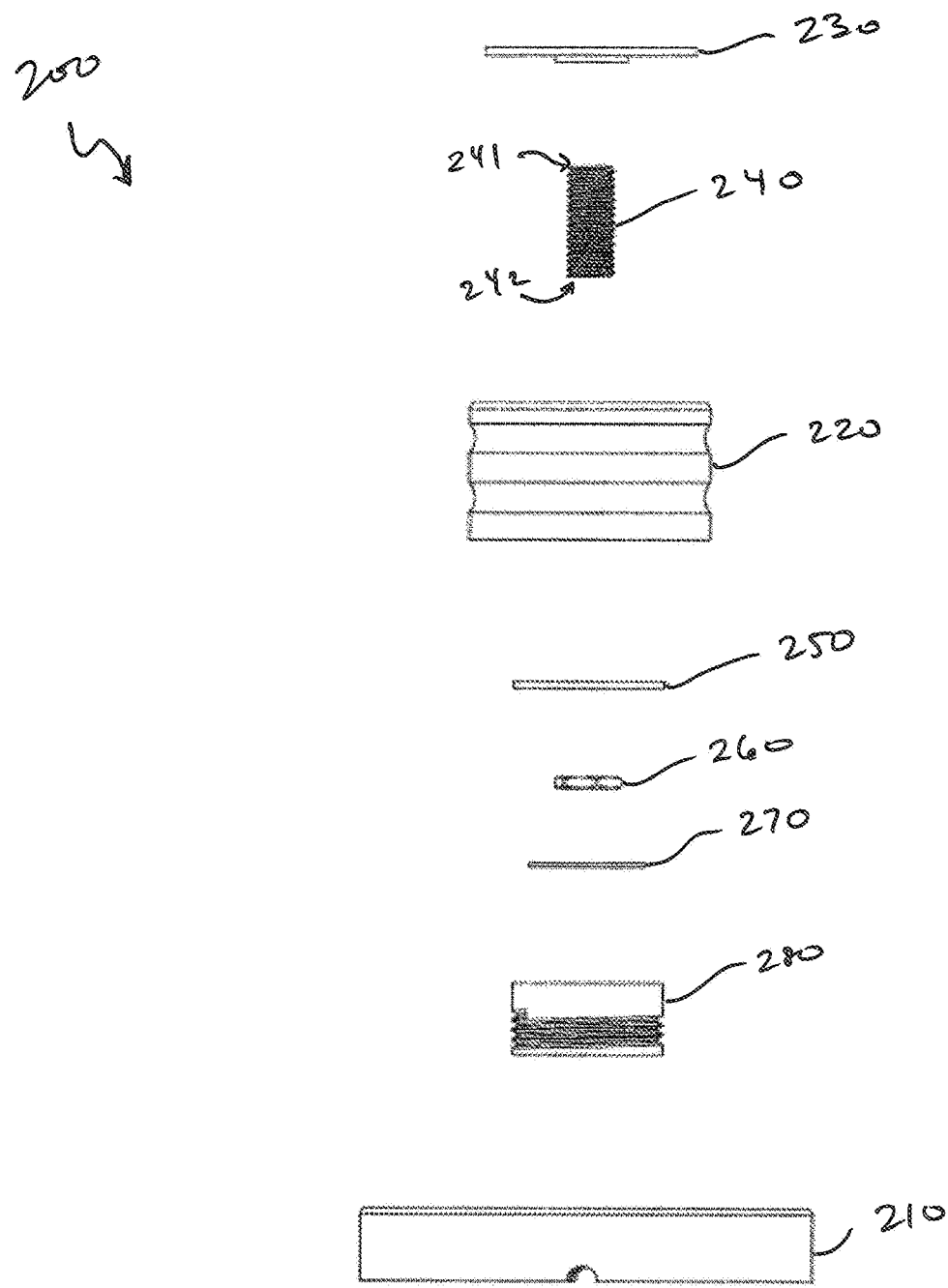
FIG. 4 is an exploded side view of the exemplary smoker of FIG. 3.

Referring now to FIGS. 3-7, a first exemplary embodiment of a smoker 200 includes the exterior visual appearance of the smoker 100 illustrated in FIGS. 1 and 2. As shown in FIGS. 3 and 4, the smoker includes a base portion 210 and a top portion 220. The smoker 200 further includes an inlet reducer 230, a hollow threaded rod 240, a washer 250, a nut 260, a mesh screen 270, and an insert 280.

Figure 5:
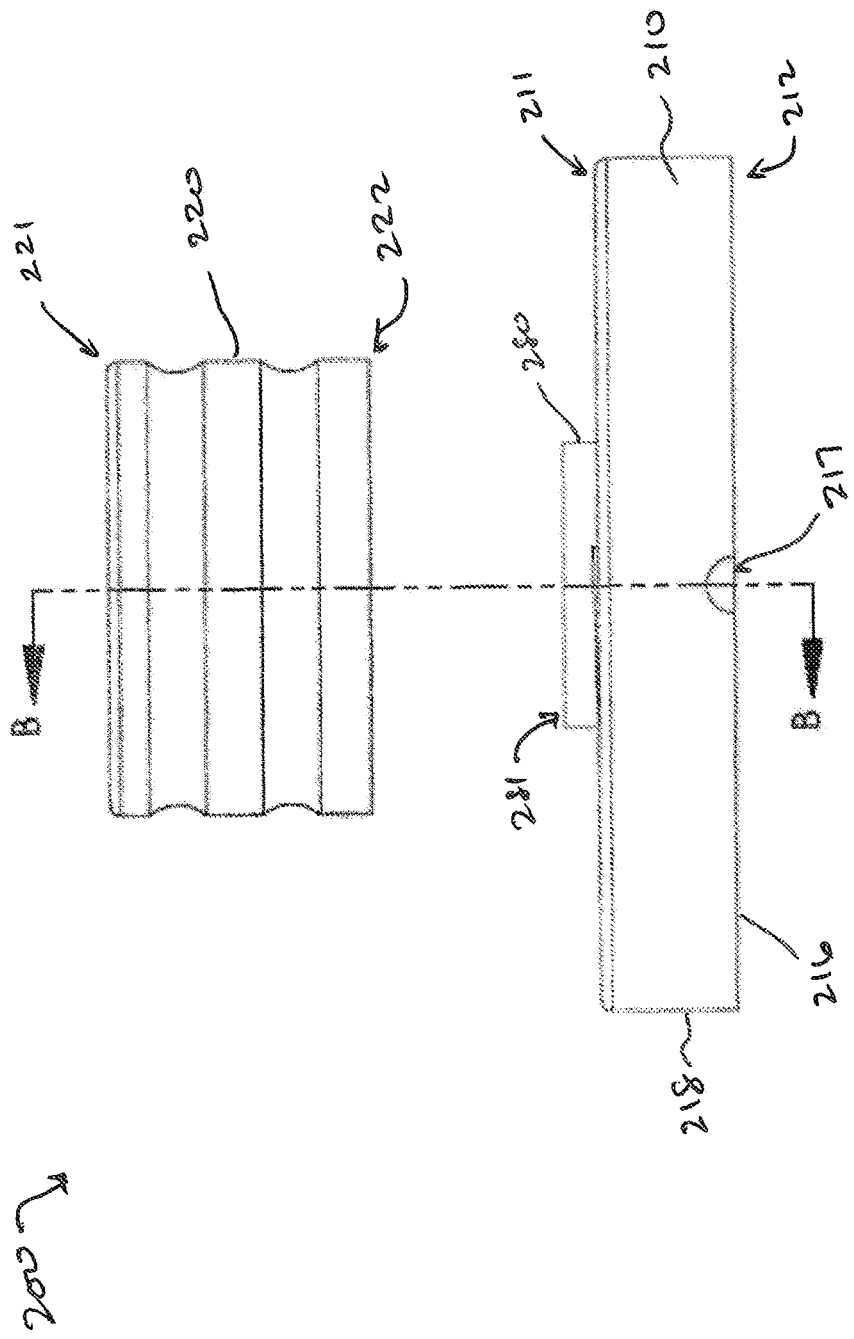
FIG. 5 is a side view of the smoker of FIG. 3 in a partially assembled configuration.
Figure 6:
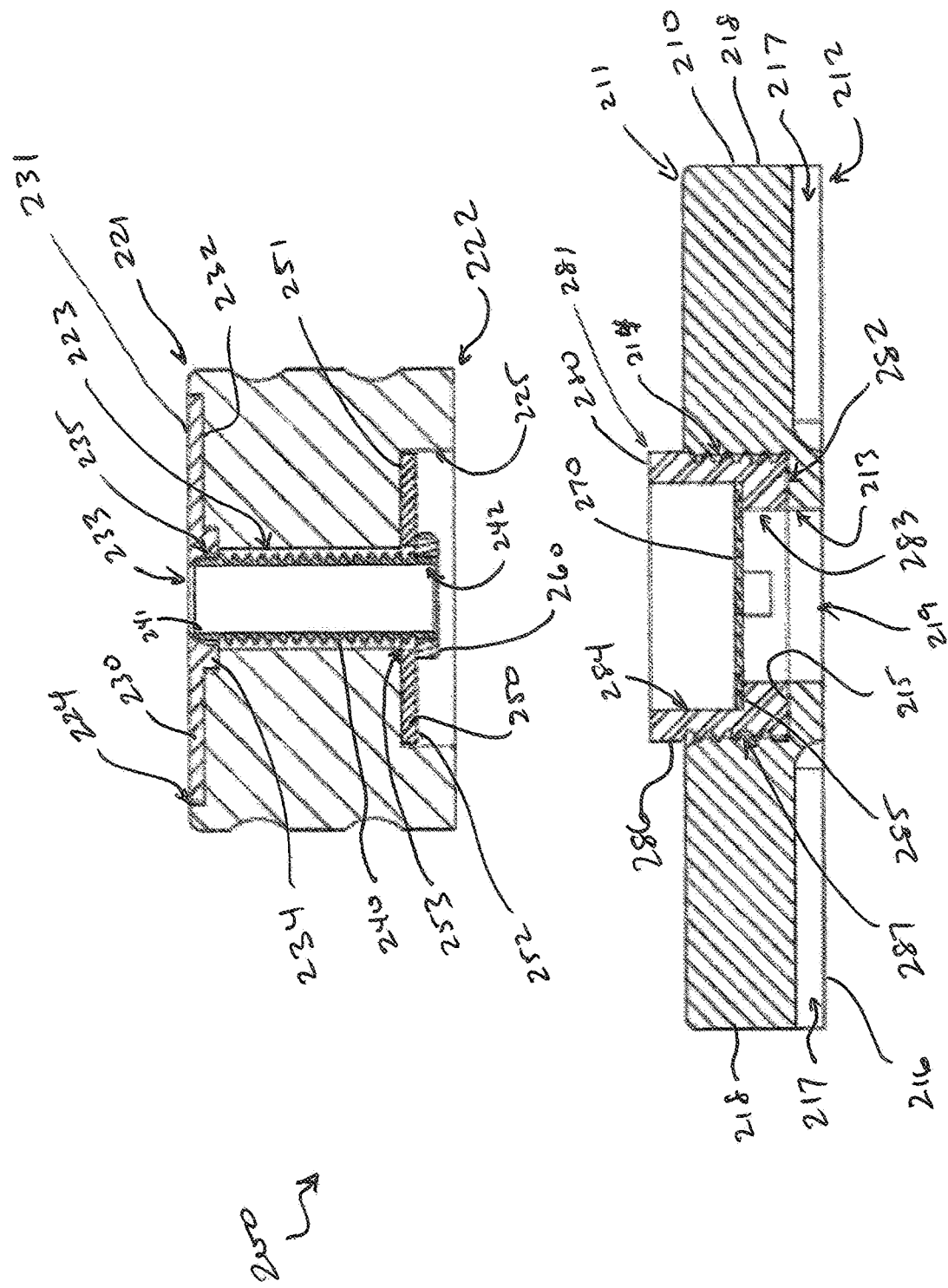
FIG. 6 is a side cross-sectional view of the partially assembled smoker of FIG. 5 along line B-B.

As shown in FIGS. 5 and 6, the top portion 220 includes a first end 221 and an opposite second end 222. The top portion 220 includes a through bore 223 extending from the first end 221 to the second end 222. At the first end 221 of the top portion 220, the through bore 223 includes a first enlarged diameter bore portion 224 having an inner diameter greater than an outer diameter of the inlet reducer 230. The second end 222 includes a second enlarged diameter portion 225 have an inner diameter that is equal to or greater than an outer diameter of the washer 250. The second end 222 is configured to be placed on a top surface 211 of the base portion 210 in an assembled configuration of the smoker 200, as will be described in more detail below.

The inlet reducer 230 includes a top surface 231, a bottom surface 232, and a through hole 233. In some aspects, the inlet reducer 230 may be circular and the through hole 233 may be at the center of the inlet reducer, as best illustrated in FIG. 6. Of course, it should be understood that the inlet reducer 230 and the through hole 233 may be any desired size and shape, for example, square, hexagon, any other polygon, or the like. The bottom surface 232 may include a projecting region 234 sized and configured to be received by the enlarged diameter bore portion 224 of the through bore 223. The through hole 233 may include a threaded portion 235 starting at the projecting region 234 and extending toward the top surface 231 of the inlet reducer 230. As shown in FIG. 6, the threaded portion 235 may not extend all the way to the top surface 231 and/or the through hole 233 may taper in a direction toward the top surface 231.

The hollow threaded rod 240 includes a first end 241 configured to be threadedly coupled with the threaded portion 235 of the through hole 235 and a second end 242 configured to threadedly receive the nut 260. An outside diameter of the hollow threaded rod 240 may be smaller than an inside diameter of the through bore 223 so that the hollow threaded rod 240 can be slidingly inserted through the through bore 223 without threading the hollow threaded rod 240 into the wall of the through bore 223.

The washer 250 includes a top surface 251, a bottom surface 252, and a through hole 253. The through hole 253 has an inside diameter greater than the outside diameter of the hollow threaded rod 240 so that the hollow threaded rod 240 can be slidingly inserted through the through hole 253 without threading the hollow threaded rod 240 into the wall of the through hole 253. The outside diameter of the washer 250 is sized and configured to be received in the second enlarged diameter portion 225 at the second end 222 of the top portion 220.

The base portion 210 includes a first end 211 and an opposite second end 212. The base portion 210 includes a through bore 213 extending from the first end 211 to the second end 212. At the first end 211 of the base portion 210, the through bore 213 includes an enlarged diameter bore portion 214 configured to receive at least a portion of the insert 280 therein. The enlarged diameter portion 214 and the through bore 213 are configured to cooperate to define an annular shelf 215.

The insert 280 includes a first end 281, a second end 282, and a through bore 283 extending from the first end 281 to the second end 282. At the first end 281, the through bore 283 includes an enlarged diameter bore portion 284 having an inner diameter greater than an outer diameter of the mesh screen 270 and being configured to receive the mesh screen 270 therein. The enlarged diameter portion 284 and the through bore 283 are configured to cooperate to define a shelf 285 configured to receive the mesh screen 270 thereon. It should be understood that the shelf may include notches to accept a tool designed to thread the insert 280 into the base portion 210.

The insert 280 includes an outer wall 286 having a threaded portion 287 at the second end 282 and extending at least part of the way toward the first end 281. The threaded portion 287 is configured to be threadedly received by the enlarged diameter bore portion 214 of the base portion 210. The annular shelf 215 may act as a stop to limit the depth to which the insert 280 can be threaded into the enlarged diameter bore portion 284.

The enlarged diameter bore portion 284 of the insert 280 and the second enlarged diameter portion 225 of the top portion 220 are configured to cooperate to define a chamber 288 configured to receive wood chips placed on the mesh screen 270. The through bore 283 of the insert 280 and the through bore 213 of the base portion 210 are configured to provide a fluid passage from the chamber 288 out through an opening 219 in a planar bottom surface 216 of the base portion 210.

The planar bottom surface 216 includes two grooves 217 that extend from an outer wall 218 of the base portion 210 inward toward the through bore 213. However, the grooves 217 end short of the through bore 213 such that the grooves 217 do not fluidly communicate with the through bore 213. As illustrated, the outer wall 218 of the base portion 210 is circular and the grooves 217 extend radially inward. As shown, in some embodiments, the base portion 210 may include two diametrically arranged grooves 217, but in other embodiments may include one groove or more than two grooves.

Figure 7:
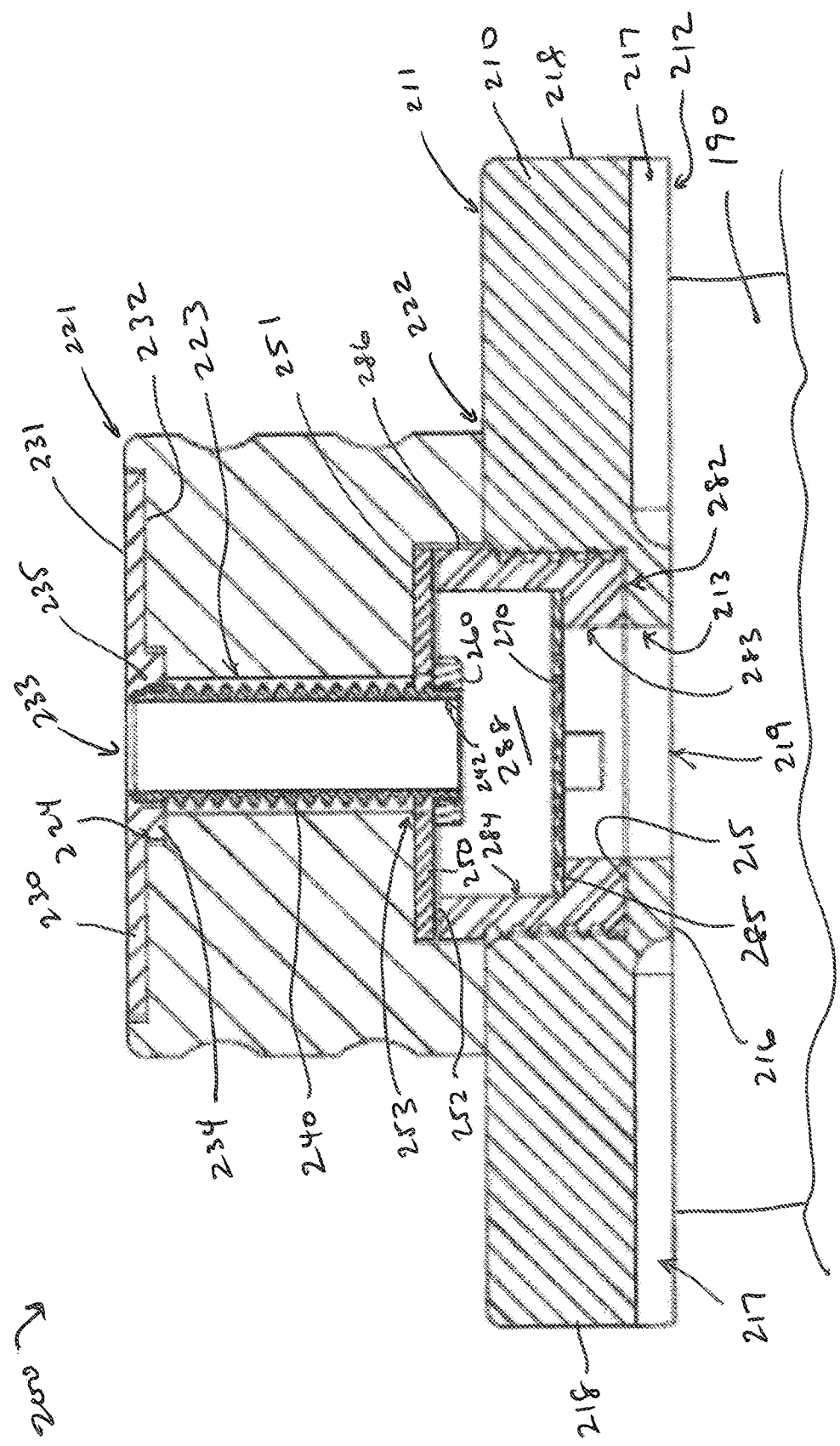
FIG. 7 is a side cross-sectional view of the smoker of FIG. 3 taken along line A-A of FIG. 2.

As shown in FIG. 7, the base portion 210 is sized and configured such that the bottom surface 216 sits on the rim of a container 190 such as, for example, a cocktail glass, a plastic container or cup, a glass jar or bottle, or the like. The rim of the container 190 should be sized larger than the diameter of the opening of the through bore 213 and smaller than the diameter of the outer wall 218 of the base portion 210 such that the through bore 213 and the grooves 217 fluidly communicate with the interior volume of the container 190. Otherwise, the bottom surface 216 cooperates with the rim of the container 190 to provide a barrier to smoke or air exiting the container 190.

To assemble the smoker 200, the first end 241 of the hollow threaded rod 240 may be threaded into the projecting region 234 of the inlet reducer 230, and the second end 242 of the hollow threaded rod 240 may be inserted through the through bore 223 of the top portion 210 until the projecting region 234 is received by the first enlarged diameter bore portion 224 of the top portion 220. The washer 250 may then be slipped over the second end 242 of the hollow threaded rod 240 and into the second enlarged diameter bore portion 225 of the top portion 220, and the nut 260 may then be threaded onto the second end 242 of the hollow threaded rod 240 to provide a top assembly 202.

To provide a base assembly 204, the threaded portion 287 of the insert 280 may be threaded into the enlarged diameter bore portion 214 of the base portion 210, and the mesh screen 270 may be inserted into the insert 280 to rest on the shelf 285. The second enlarged diameter bore portion 225 of the top portion 220 may have an inner diameter that is greater than an outer diameter of the insert 280 such that a portion of the insert 280 extending from the first end 211 of the base portion 210 can be received in the second enlarged diameter bore portion 225 of the top portion 220 when the top assembly 202 is placed onto the base assembly 214. It should be appreciated that the dimension of the second enlarged diameter bore portion 225 of the top portion 220 and the outer diameter of the insert 280 may be reversed such that the second enlarged diameter bore portion 225 of the top portion 220 may be received in a portion of the insert 280 extending from the first end 211 of the base portion 210 when the top assembly 202 is placed onto the base assembly 214. Use of the smoker 200 is described in more detail below.

Figure 8:
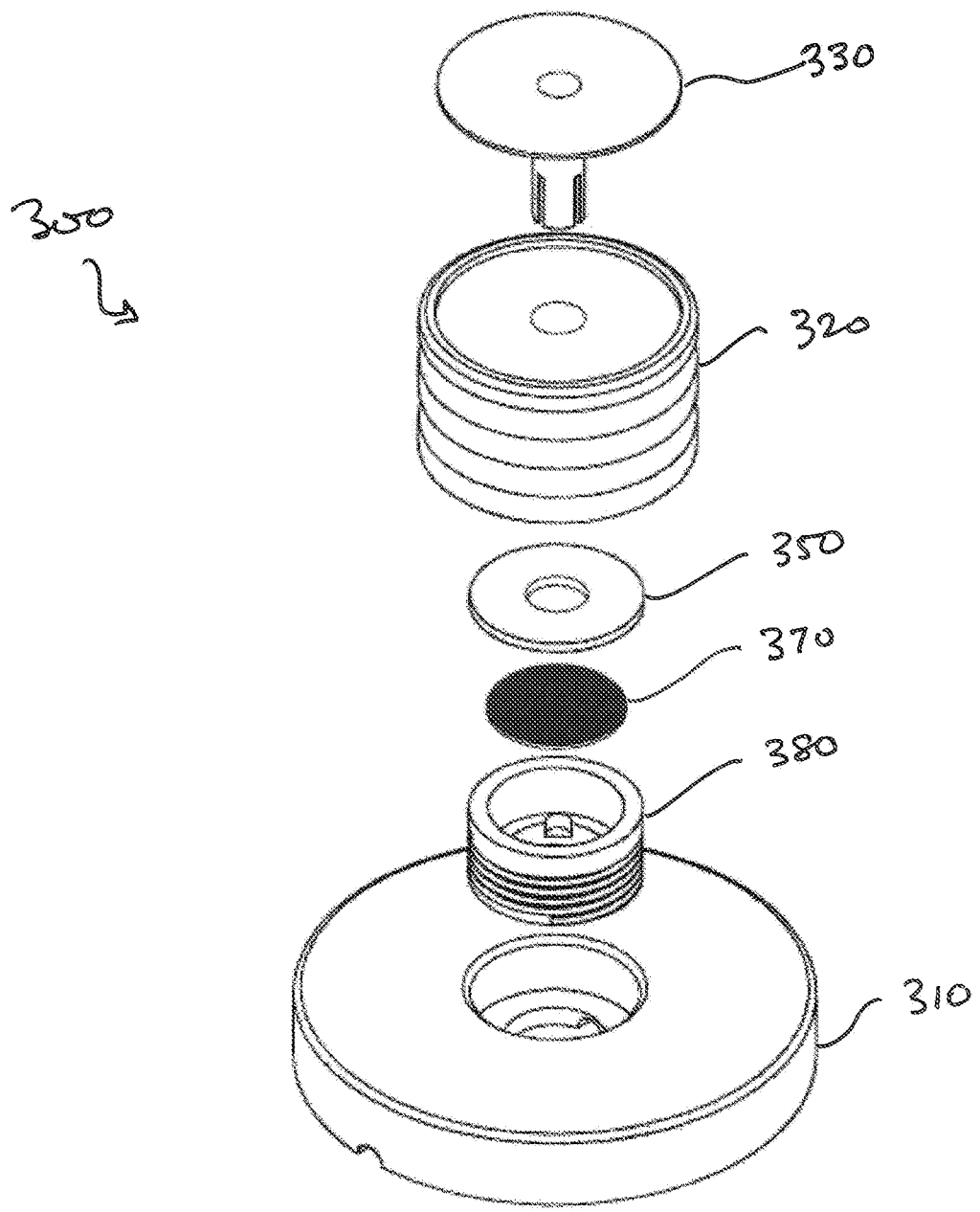
FIG. 8 is an exploded top, front perspective view of a second exemplary embodiment of the smoker of FIG. 1.
Figure 9:
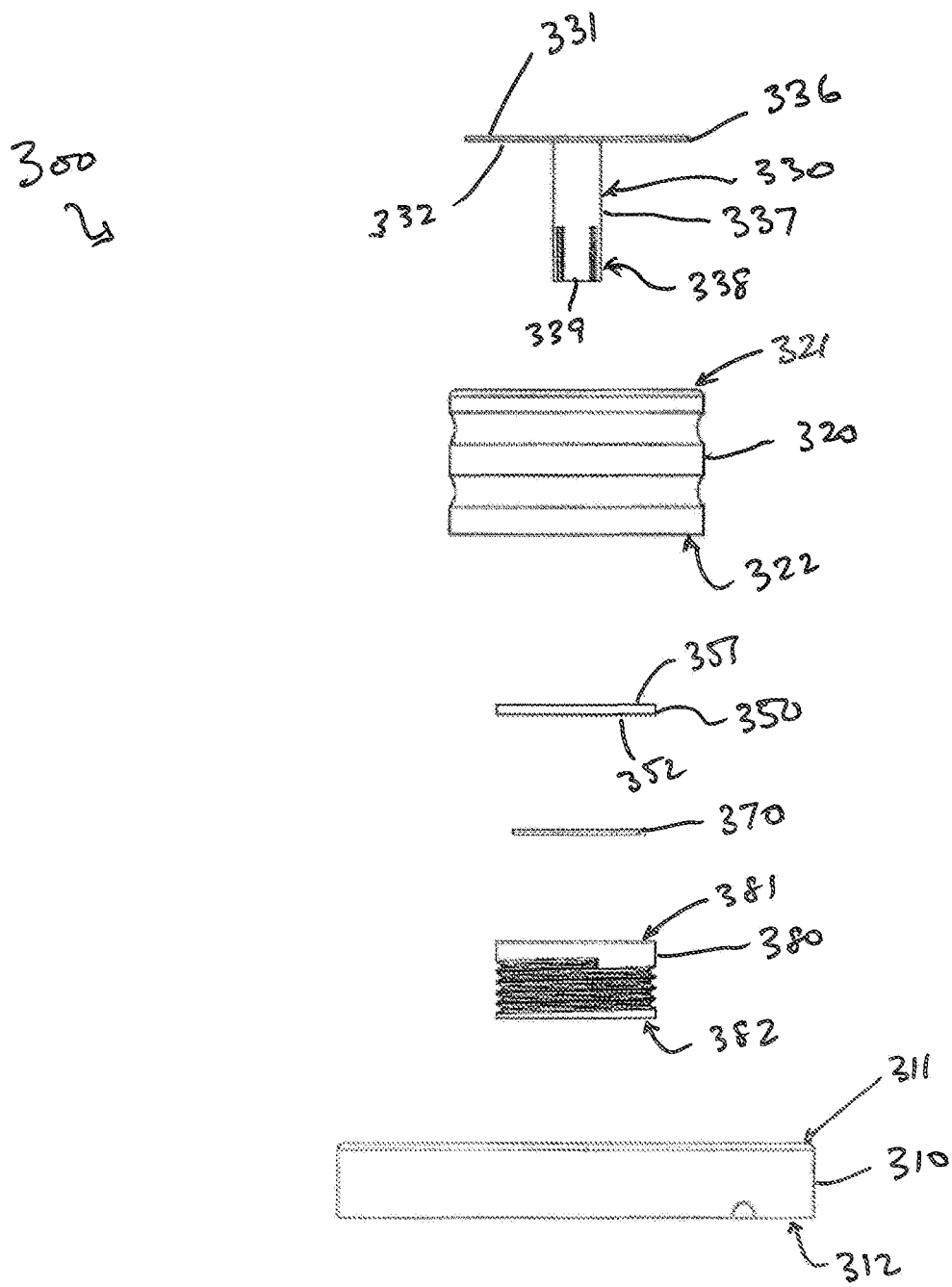
FIG. 9 is an exploded side view of the exemplary smoker of FIG. 8.

Referring now to FIGS. 8-12, a second exemplary embodiment of a smoker 300 includes the exterior visual appearance of the smoker 100 illustrated in FIGS. 1 and 2. As shown in FIGS. 8 and 9, the smoker includes a base portion 310 and a top portion 320. The smoker 300 further includes an inlet reducer 330, a washer 350, a mesh screen 370, and an insert 380.

Figure 10:
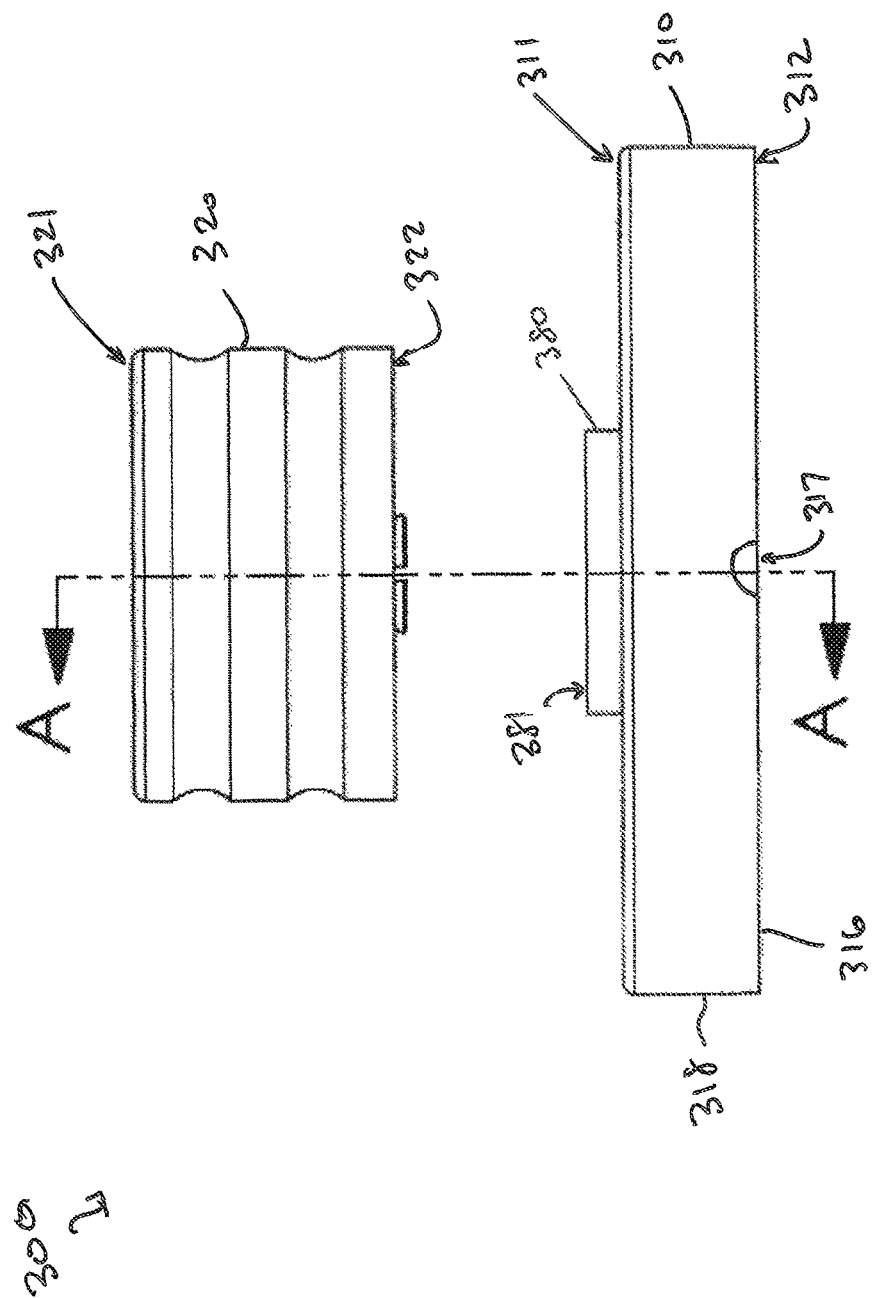
FIG. 10 is a side view of the smoker of FIG. 8 in a partially assembled configuration.
Figure 11:
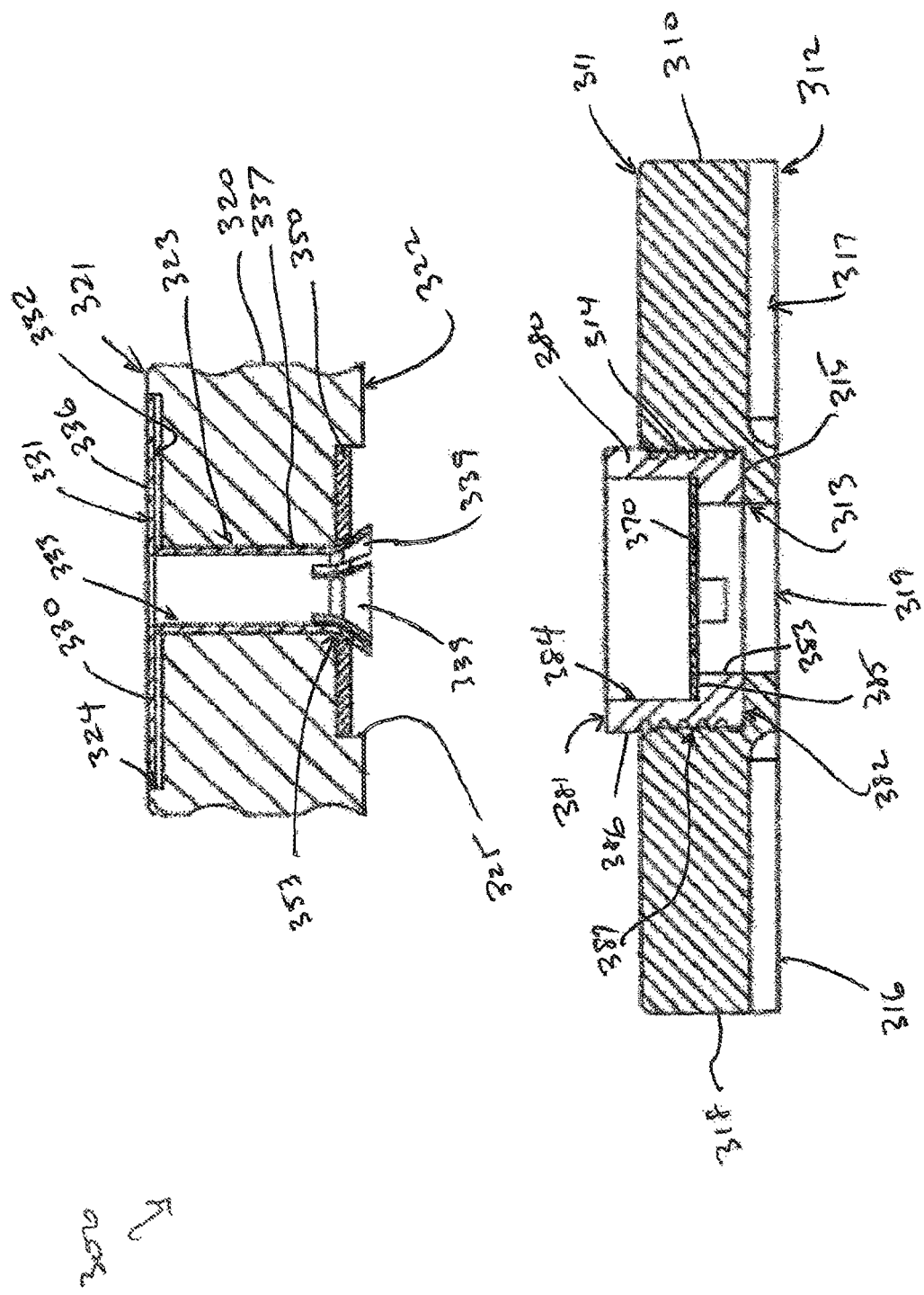
FIG. 11 is a side cross-sectional view of the partially assembled smoker of FIG. 10.

As shown in FIGS. 10 and 11, the top portion 320 includes a first end 321 and an opposite second end 322. The top portion 320 includes a through bore 323 extending from the first end 321 to the second end 322. At the first end 321 of the top portion 320, the through bore 323 includes a first enlarged diameter bore portion 324 having an inner diameter greater than an outer diameter of the inlet reducer 330. The second end 322 includes a second enlarged diameter portion 325 have an inner diameter that is equal to or greater than an outer diameter of the washer 350. The second end 322 is configured to be placed on a top surface 312 of the base portion 310 in an assembled configuration of the smoker 300, as will be described in more detail below.

The inlet reducer 330 includes a plate portion 336 and a tubular portion 337. The plate portion 336 has a top surface 331, a bottom surface 332, and a through hole 333. The tubular portion 337 extends from the bottom surface 332 to a free end 338 having a plurality of fingers 339. In some aspects, the plate portion 336 may be circular and the through hole 333 may be at the center of the plate portion 336, as best illustrated in FIG. 11. The plate portion 337 is sized and configured to be received by the first enlarged diameter bore portion 324 of the through bore 323. The tubular portion 337 includes an outside diameter that is smaller than an inside diameter of the through bore 323.

The washer 350 includes a top surface 351, a bottom surface 352, and a through hole 353. The through hole 353 has an inside diameter greater than the outside diameter of the tubular portion 337 so that the tubular portion can be slidingly inserted through the through hole 353. The outside diameter of the washer 350 is sized and configured to be received in the second enlarged diameter portion 325 at the second end 322 of the top portion 320.

As shown in FIGS. 8 and 9, the fingers 339 may be formed in the same tubular shape as a remainder of the tubular portion 337. After the tubular portion 337 is inserted into the through bore 323 such that the fingers 339 extend out of the second end 322 of the top portion 320 and the washer 350 is slipped over the fingers 339, the fingers 339 can be bent or otherwise deformed to hold the washer 350 in the second enlarged diameter portion 325 of the top portion 320.

Figure 12:
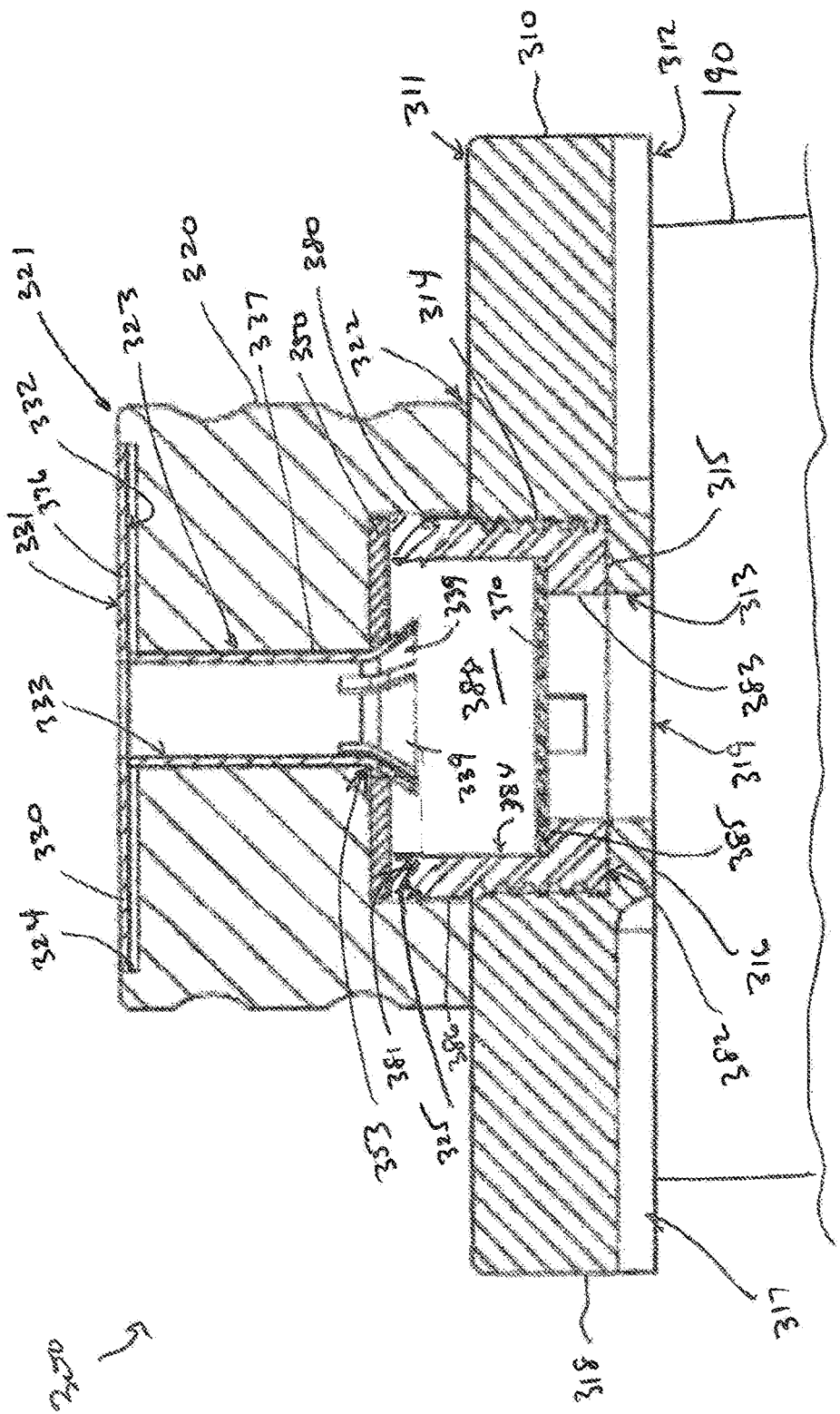
FIG. 12 is a side cross-sectional view of the smoker of FIG. 8 taken along line A-A of FIG. 2.

It should be appreciate that in other embodiments, the fingers 339 may be original formed in a flared configuration, as shown in FIGS. 11 and 12, but may be resiliently flexible such that the fingers 339 can be urged radially inward to match the same tubular shape as a remainder of the tubular portion 337 so that the fingers 339 can be inserted into the through bore 323 of the top portion 320 and through the through hole 353 of the washer 350. After the fingers 339 extend out of the through hole 353, the fingers can then resiliently return to their original flared configuration shown in FIGS. 11 and 12 to hold the washer 350 in the second enlarged diameter portion 325 of the top portion 320.

The base portion 310 includes a first end 311 and an opposite second end 312. The base portion 310 includes a through bore 313 extending from the first end 311 to the second end 312. At the first end 311 of the base portion 310, the through bore 313 includes an enlarged diameter bore portion 314 configured to receive at least a portion of the insert 380 therein. The enlarged diameter portion 314 and the through bore 313 are configured to cooperate to define an annular shelf 315.

The insert 380 includes a first end 381, a second end 382, and a through bore 383 extending from the first end 381 to the second end 382. At the first end 381, the through bore 383 includes an enlarged diameter bore portion 384 having an inner diameter greater than an outer diameter of the mesh screen 370 and being configured to receive the mesh screen 370 therein. The enlarged diameter portion 384 and the through bore 383 are configured to cooperate to define a shelf 385 configured to receive the mesh screen 370 thereon. It should be understood that the shelf may include notches to accept a tool designed to thread the insert 380 into the base portion 310.

The insert 380 includes an outer wall 386 having a threaded portion 387 at the second end 382 and extending at least part of the way toward the first end 381. The threaded portion 387 is configured to be threadedly received by the enlarged diameter bore portion 314 of the base portion 310.

The annular shelf 315 may act as a stop to limit the depth to which the insert 380 can be threaded into the enlarged diameter bore portion 384.

The enlarged diameter bore portion 384 of the insert 380 and the second enlarged diameter portion 325 of the top portion 320 are configured to cooperate to define a chamber 388 configured to receive wood chips placed on the mesh screen 370. The through bore 383 of the insert 380 and the through bore 313 of the base portion 310 are configured to provide a fluid passage from the chamber 388 out through an opening 319 in a planar bottom surface 316 of the base portion 310.

The planar bottom surface 316 includes two grooves 317 that extend from an outer wall 318 of the base portion 310 inward toward the through bore 313. However, the grooves 317 end short of the through bore 313 such that the grooves 317 do not fluidly communicate with the through bore 313. As illustrated, the outer wall 318 of the base portion 310 is circular and the grooves 317 extend radially inward. As shown, in some embodiments, the base portion 310 may include two diametrically arranged grooves 317, but in other embodiments may include one groove or more than two grooves.

As shown in FIG. 12, the base portion 310 is sized and configured such that the bottom surface 316 sits on the rim of a container 190 such as, for example, a cocktail glass, a plastic container or cup, a glass jar or bottle, or the like. The rim of the container 190 should be sized larger than the diameter of the opening of the through bore 313 and smaller than the diameter of the outer wall 318 of the base portion 310 such that the through bore 313 and the grooves 317 fluidly communicate with the interior volume of the container 190. Otherwise, the bottom surface 316 cooperates with the rim of the container 190 to provide a barrier to smoke or air exiting the container 190.

To assemble the smoker 300, the tubular portion 337 of the inlet reducer 330 is inserted through the through bore 323 of the top portion 339 with the fingers 339 arranged to match the same tubular shape as a remainder of the tubular portion 337 so that the fingers 339 can be inserted into the through bore 323 of the top portion 320. After the fingers 339 extend out of the through hole 353, the washer 350 is slipped over the fingers 339 onto the tubular portion 337. The fingers 337 are then permitted to resiliently return to the flared configuration shown in the figures (or bent or deformed to the flared configuration) to hold the washer 350 in the second enlarged diameter portion 325 of the top portion 320 so as to provide a top assembly 302.

To provide a base assembly 304, the threaded portion 387 of the insert 380 may be threaded into the enlarged diameter bore portion 314 of the base portion 310, and the mesh screen 370 may be inserted into the insert 380 to rest on the shelf 385. The second enlarged diameter bore portion 325 of the top portion 320 may have an inner diameter that is greater than an outer diameter of the insert 380 such that a portion of the insert 380 extending from the first end 311 of the base portion 310 can be received in the second enlarged diameter bore portion 325 of the top portion 320 when the top assembly 302 is placed onto the base assembly 314. It should be appreciated that the dimensions of the second enlarged diameter bore portion 325 of the top portion 320 and the outer diameter of the insert 380 may be reversed such that the second enlarged diameter bore portion 325 of the top portion 320 can be received in a portion of the insert 380 extending from the first end 311 of the base portion 310 when the top assembly 302 is placed onto the base assembly 314. Use of the smoker 300 is described in more detail below.

Figure 13:
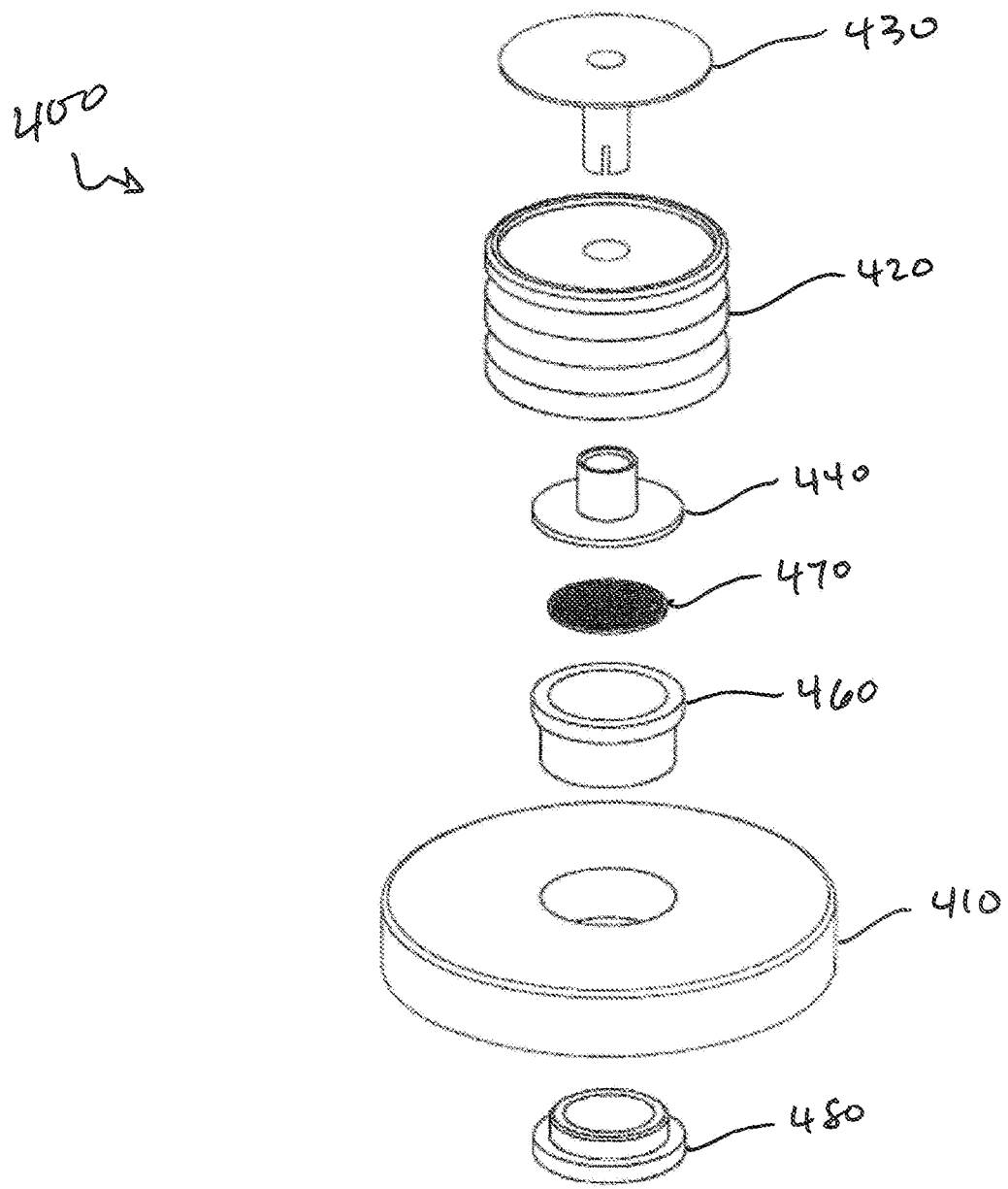
FIG. 13 is an exploded top, front perspective view of a third exemplary embodiment of the smoker of FIG. 1.
Figure 14:
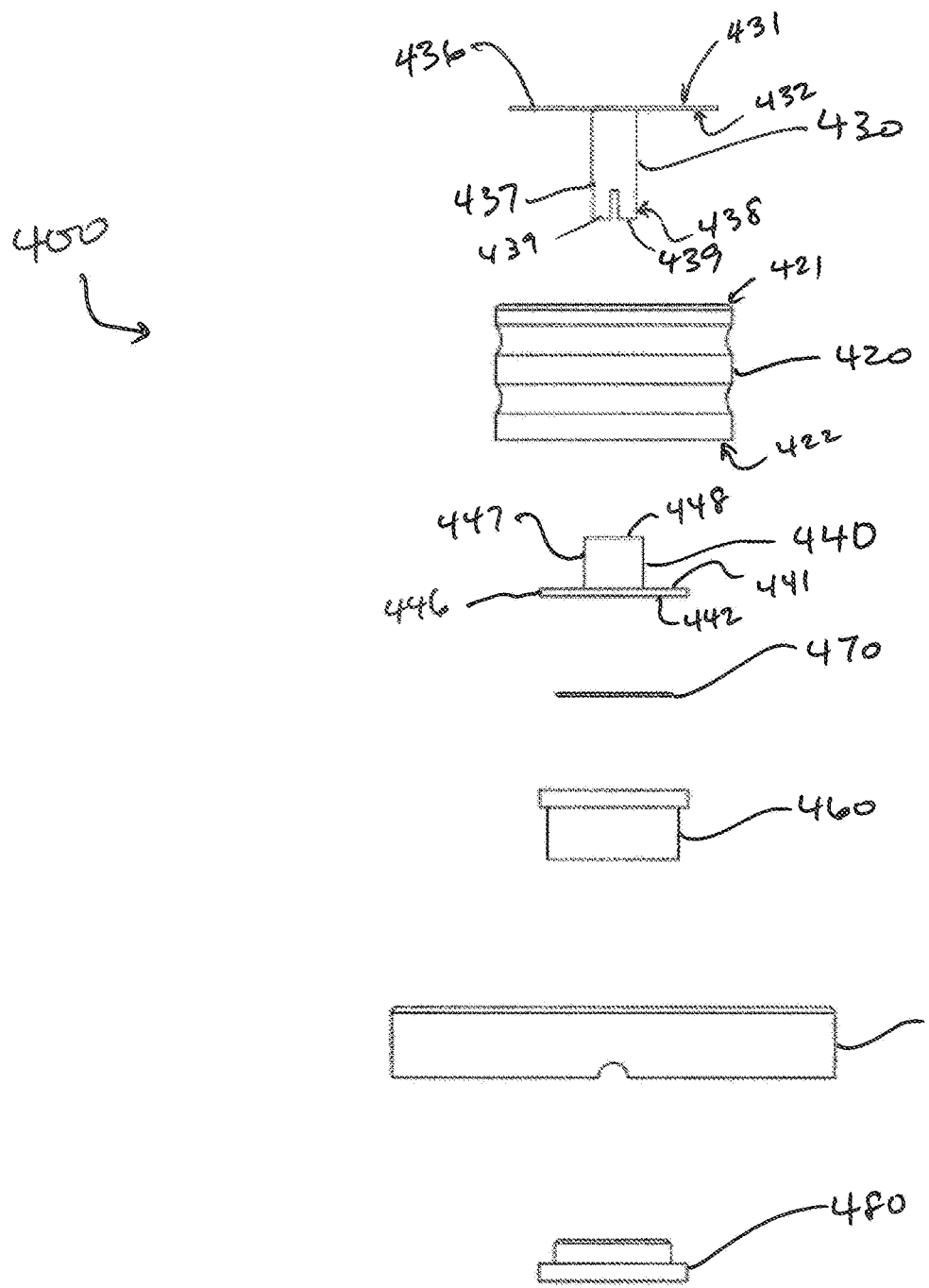
FIG. 14 is an exploded side view of the exemplary smoker of FIG. 13.

Referring now to FIGS. 13-17, a third exemplary embodiment of a smoker 400 includes the exterior visual appearance of the smoker 100 illustrated in FIGS. 1 and 2. As shown in FIGS. 13 and 14, the smoker includes a base portion 410 and a top portion 420. The smoker 400 further includes an inlet reducer 430, a first insert 440, a mesh screen 470, a second insert 480, and a third insert 460.

Figure 15:
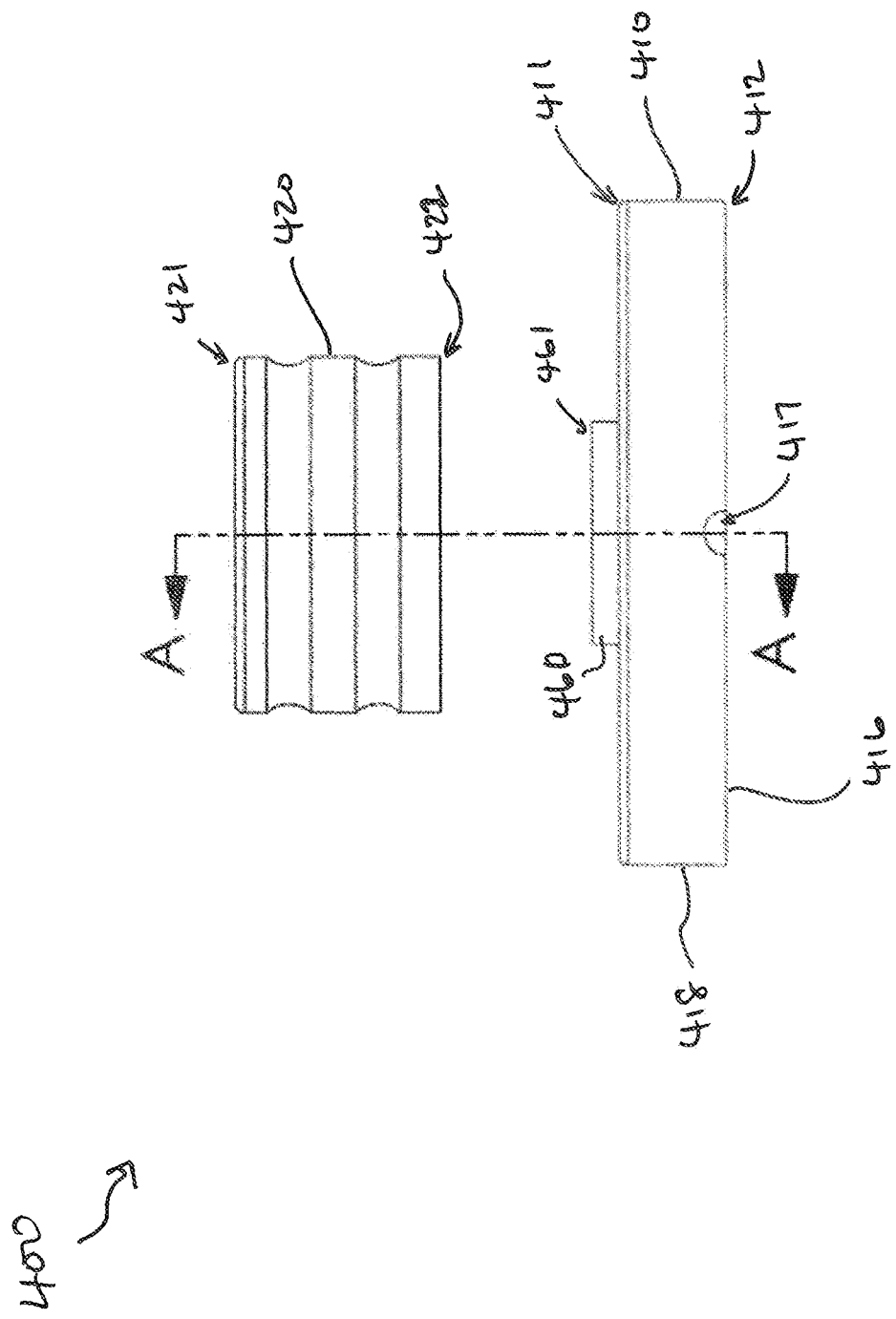
FIG. 15 is a side view of the smoker of FIG. 13 in a partially assembled configuration.
Figure 16:
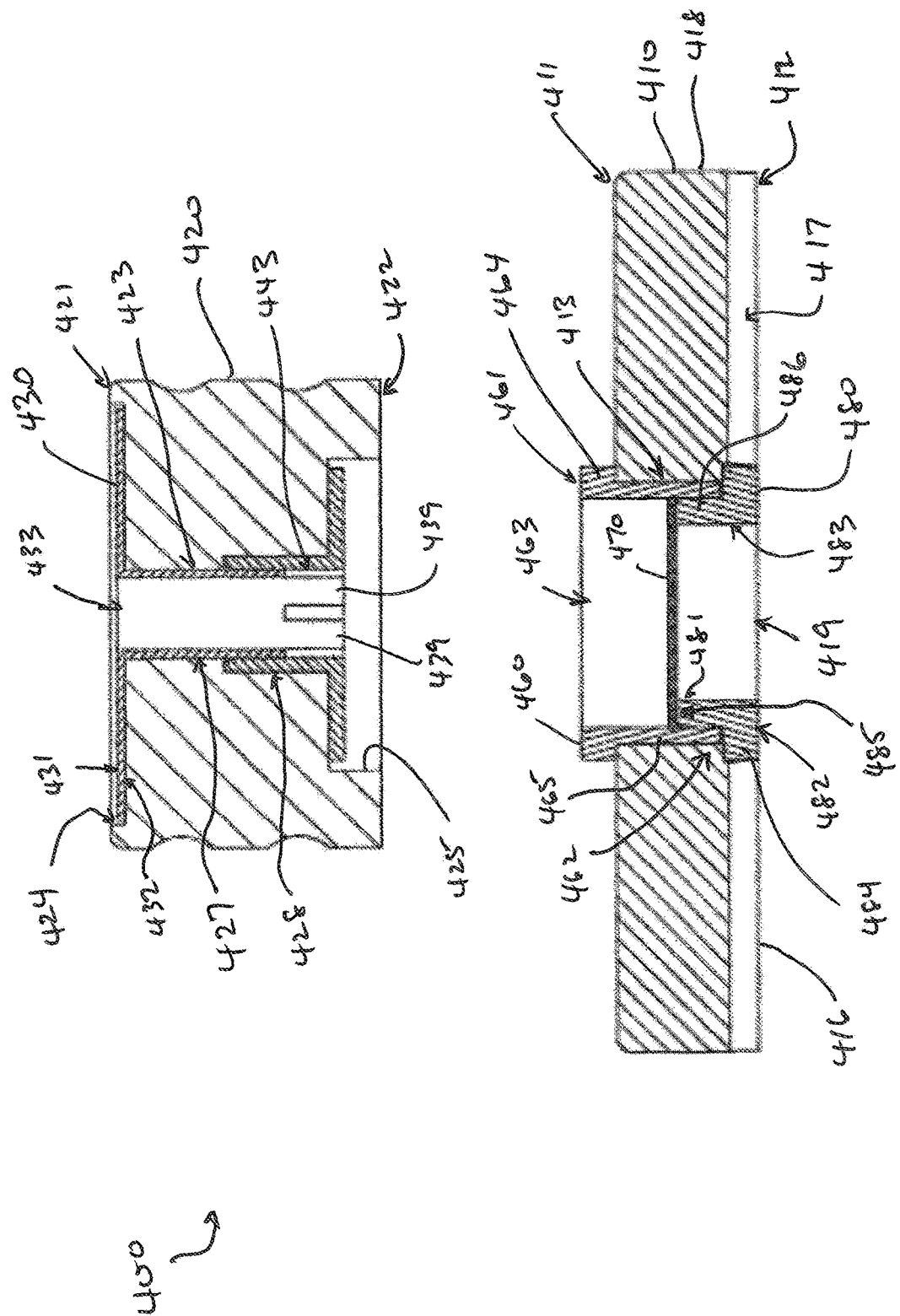
FIG. 16 is a side cross-sectional view of the partially assembled smoker of FIG. 15.

As shown in FIGS. 15 and 16, the top portion 420 includes a first end 421 and an opposite second end 422. The top portion 420 includes a through bore 423 extending from the first end 421 to the second end 422. The through bore 423 includes a first bore portion 427 that is nearer the first end and has a smaller diameter than a second bore portion 428 that is nearer the second end. At the first end 421 of the top portion 420, the through bore 423 includes a first enlarged diameter bore portion 424 having an inner diameter greater than an outer diameter of the inlet reducer 430. The second end 422 includes a second enlarged diameter portion 425 have an inner diameter that is equal to or greater than an outer diameter of the first insert 440. The second end 422 is configured to be placed on a top surface 412 of the base portion 410 in an assembled configuration of the smoker 400, as will be described in more detail below.

The inlet reducer 430 includes a plate portion 436 and a tubular portion 437. The plate portion 436 has a top surface 431, a bottom surface 432, and a through hole 433. The tubular portion 437 extends from the bottom surface 432 to a free end 438 having a plurality of fingers 439. In some aspects, the plate portion 436 may be circular and the through hole 433 may be at the center of the plate portion 436, as best illustrated in FIG. 11. The plate portion 437 is sized and configured to be received by the first enlarged diameter bore portion 424 of the through bore 423, and the tubular portion 437 is configured to be received by the first bore portion 427 of the through bore 423. The tubular portion 437 includes an outside diameter that is smaller than an inside diameter of the first bore portion 427.

The first insert 440 includes a plate portion 446 and a tubular portion 447. The plate portion 446 has a top surface 441, a bottom surface 442, and a through hole 443. The tubular portion 447 extends from the top surface 441 to a free end 448. In some aspects, the plate portion 446 may be circular and the through hole 443 may be at the center of the plate portion 446. The plate portion 447 is sized and configured to be received by the second enlarged diameter bore portion 425 of the through bore 423, and the tubular portion 447 is configured to be received by the second bore portion 428 of the through bore 423. The tubular portion 447 includes an outside diameter that is smaller than an inside diameter of the second bore portion 428 but is larger than an inside diameter of the first bore portion 427. The tubular portion 447 includes an inside diameter that is slightly smaller than an outside diameter of the tubular portion 437 of the inlet reducer 430 such that the tubular portion 447 of the first insert 440 is configured to be received the tubular portion 437 of the inlet reducer 430 in a press fit relationship.

For example, in some aspects, the fingers 439 may be flexible such that the fingers 439 can be urged radially inward when the tubular portion 437 is inserted into the first insert 440, and/or the free end 448 of the first insert may include chamfered edges to assist with inserting the tubular portion 437 into the tubular portion 447 in the press fit relationship.

The base portion 410 includes a first end 411 and an opposite second end 412. The base portion 410 includes a through bore 413 extending from the first end 411 to the second end 412. At the first end 411 of the base portion 410, the through bore 413 is configured to receive at least a portion of the second insert 480 therein.

The second insert 480 includes a first end 481, a second end 482, and a through bore 483 extending from the first end 481 to the second end 482. The second insert 480 includes an enlarged flange portion 484 at the first end 481, and a tubular portion 486 extending from the first end 481 to the second end 482. The enlarged flange portion 484 has an outer diameter greater than an inner diameter of the through bore 413 of the base portion 410 thus preventing the flange portion 484 from entering the through bore 413.

The third insert 460 includes a first end 461, a second end 462, and a through bore 463 extending from the first end 461 to the second end 462. The third insert 460 includes an enlarged flange portion 464 at the second end 462, and a tubular portion 465 extending from the second end 462 to the first end 461. The enlarged flange portion 464 has an outer diameter greater than the inner diameter of the through bore 413 of the base portion 410 thus preventing the flange portion 464 from entering the through bore 413.

The through bore 483 of the second insert 480 includes an inside diameter that is slightly smaller than an outside diameter of the tubular portion 465 of the third insert 460 such that the tubular portion 465 of the third insert 460 is configured to be received by the tubular portion 486 of the second insert 480 in a press fit relationship. The tubular portion 486 of the second insert 480 includes an inner diameter that is greater than an outer diameter of the mesh screen 470 and is configured to receive the mesh screen 470 therein. When the tubular portion 465 of the third insert 460 is received by the tubular portion 486 of the second insert 480 in the press fit relationship, the first end 461 of the third insert is configured to cooperate to define a shelf 485 configured to receive the mesh screen 470 thereon.

The through bore 483 of the second insert 480 and the second enlarged diameter portion 425 of the top portion 420 are configured to cooperate to define a chamber 488 configured to receive wood chips placed on the mesh screen 470. The through bore 463 of the third insert 460 is configured to provide a fluid passage from the chamber 488 out through an opening 419 in a planar bottom surface 416 of the base portion 410.

The planar bottom surface 416 includes two grooves 417 that extend from an outer wall 418 of the base portion 410 inward toward the through bore 413. However, the grooves 417 end short of the through bore 413 and are blocked by the third insert 460 such that the grooves 417 do not fluidly communicate with the through bore 413. As illustrated, the outer wall 418 of the base portion 410 is circular and the grooves 417 extend radially inward. As shown, in some embodiments, the base portion 410 may include two diametrically arranged grooves 417, but in other embodiments may include one groove or more than two grooves.

Figure 17:
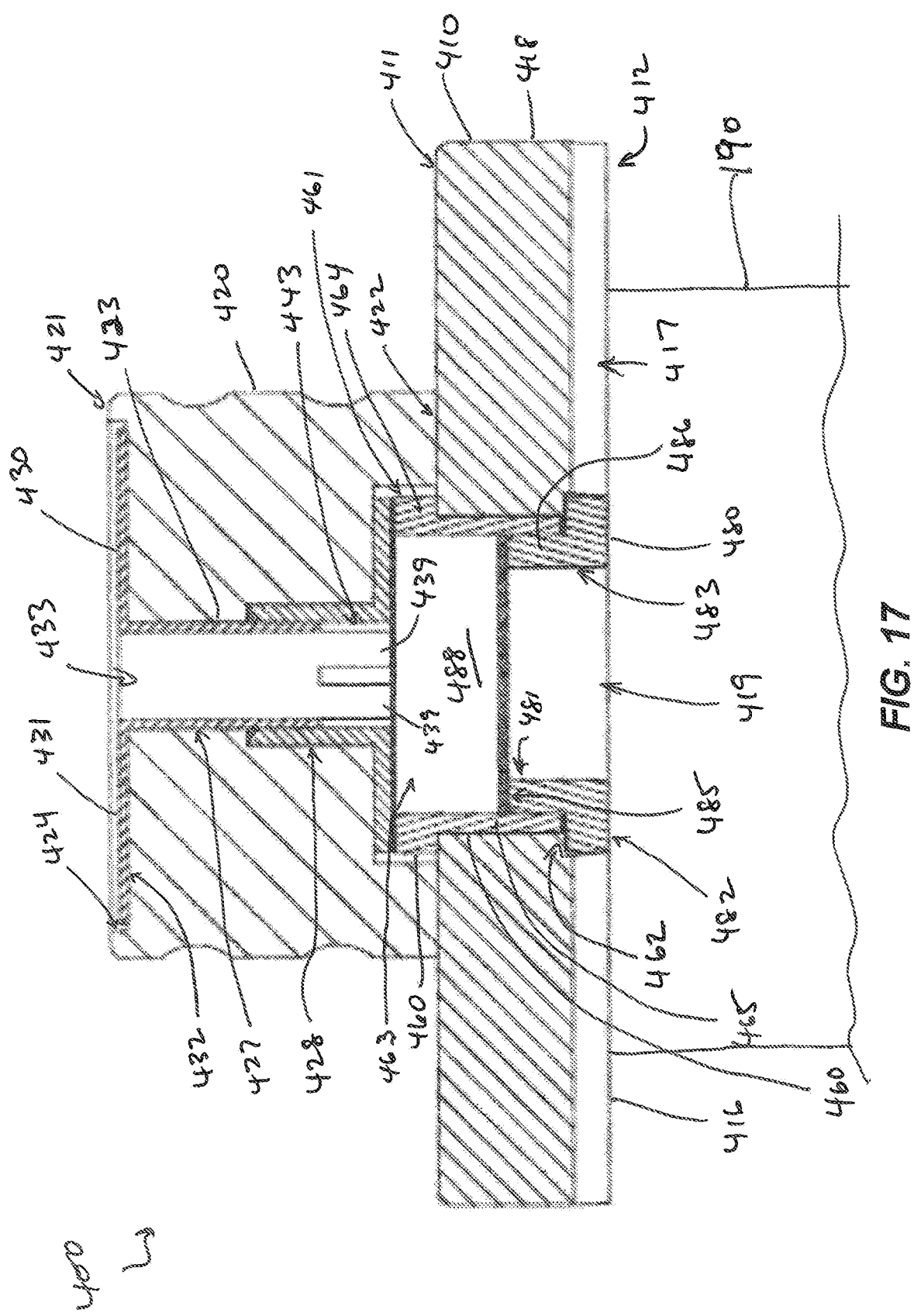
FIG. 17 is a side cross-sectional view of the smoker of FIG. 13 taken along line A-A of FIG. 2.

As shown in FIG. 17, the base portion 410 is sized and configured such that the bottom surface 416 sits on the rim of a container 190 such as, for example, a cocktail glass, a plastic container or cup, a glass jar or bottle, or the like. The rim of the container 190 should be sized larger than the diameter of the opening of the through bore 413 and smaller than the diameter of the outer wall 418 of the base portion 410 such that the through bore 413 and the grooves 417 fluidly communicate with the interior volume of the container 190. Otherwise, the bottom surface 416 cooperates with the rim of the container 190 to provide a barrier to smoke or air exiting the container 190.

To assemble the smoker 400, the first end 441 of the first insert 440 is inserted into the second enlarged diameter bore portion 425 of the through bore 423, with the tubular portion 447 of the first insert 440 being inserted into the second bore portion 428 of the through bore 423. The tubular portion 437 of the inlet reducer 330 is inserted into the first bore portion 427 of the through bore 423 of the top portion 420 and is press fit into the through bore 443 of the first insert 440 so as to provide a top assembly 402.

To provide a base assembly 404, the tubular portion 465 of the third insert 460 is inserted into the through bore 413 of the base portion 410, and the tubular portion 486 of the second insert 480 is press fit into the through bore 463 of the third insert 460. The mesh screen 470 may be inserted into the through bore 463 of the third insert 460 to rest on the shelf 485.

The second enlarged diameter bore portion 425 of the top portion 420 may have an inner diameter that is greater than an outer diameter of the enlarged flange portion 464 of the third insert 460 such that the enlarged flange portion 464 of the third insert 460 extending from the first end 411 of the base portion 410 can be received in the second enlarged diameter bore portion 425 of the top portion 420 when the top assembly 402 is placed onto the base assembly 404. It should be appreciated that the dimensions of the second enlarged diameter bore portion 425 of the top portion 420 and the enlarged flange portion 464 of the third insert 460 may be reversed such that the second enlarged diameter bore portion 425 of the top portion 420 can be received in the enlarged flange portion 464 of the third insert 460 extending from the first end 411 of the base portion 410 when the top assembly 402 is placed onto the base assembly 404. Use of the smoker 400 is described in more detail below.

Figure 20:
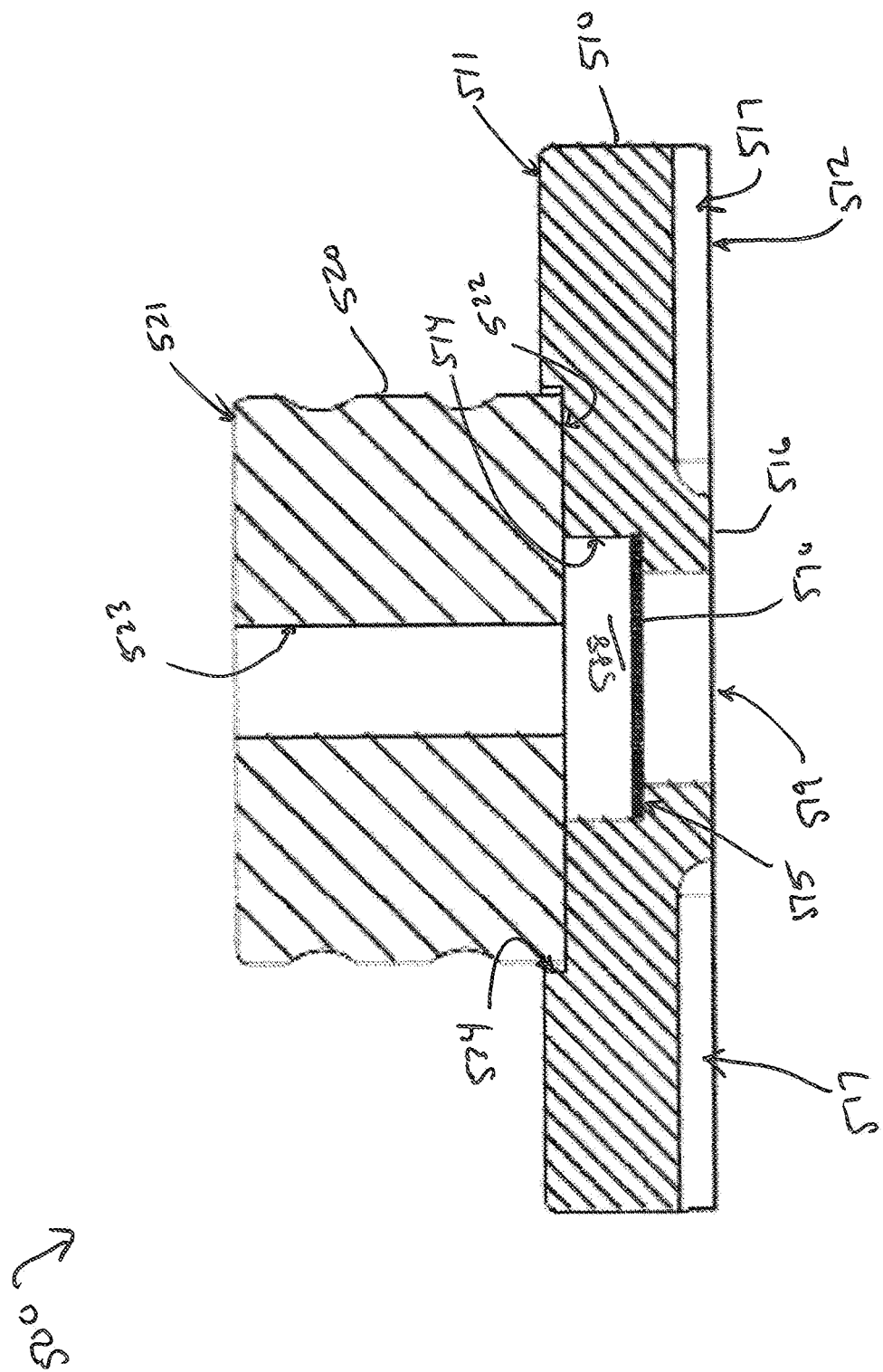
FIG. 20 is a side cross-sectional view of the smoker of FIG. 19 taken along line A-A of FIG. 2.
Figure 26:
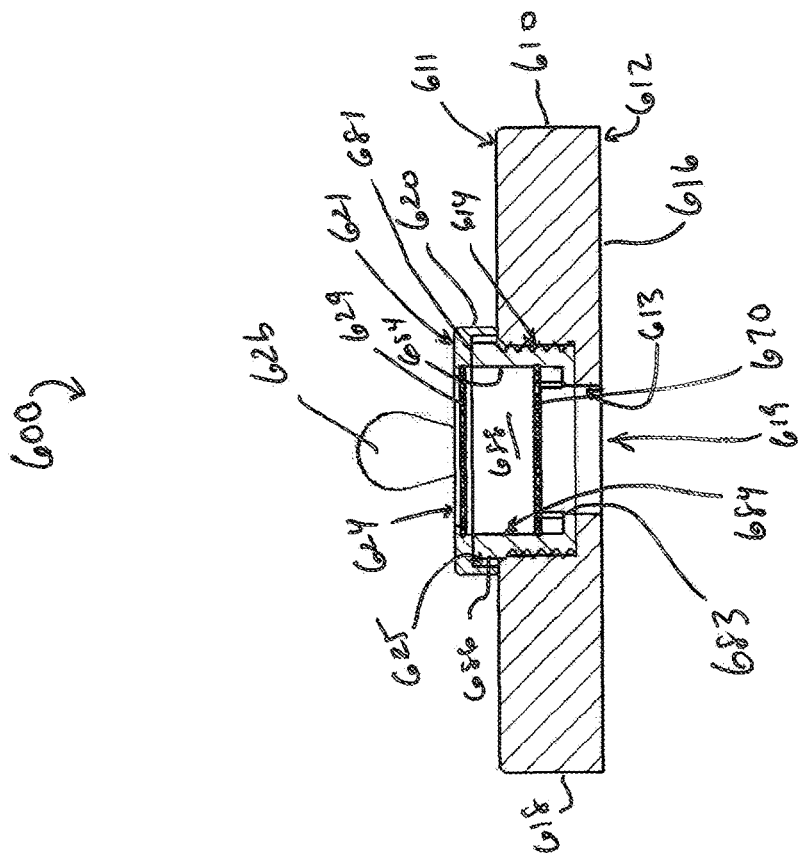
FIG. 26 is a side cross-sectional view of the smoker of FIG. 21 taken along line A-A of FIG. 21.
Figure 21:
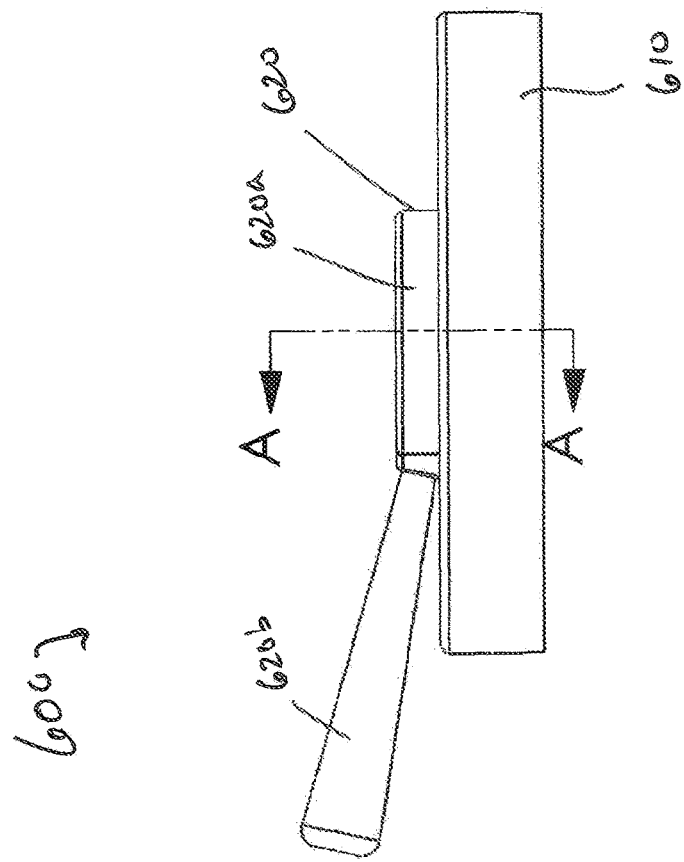
FIG. 21 is a side view of a fifth exemplary embodiment of the smoker of FIG. 1.
Figure 22:
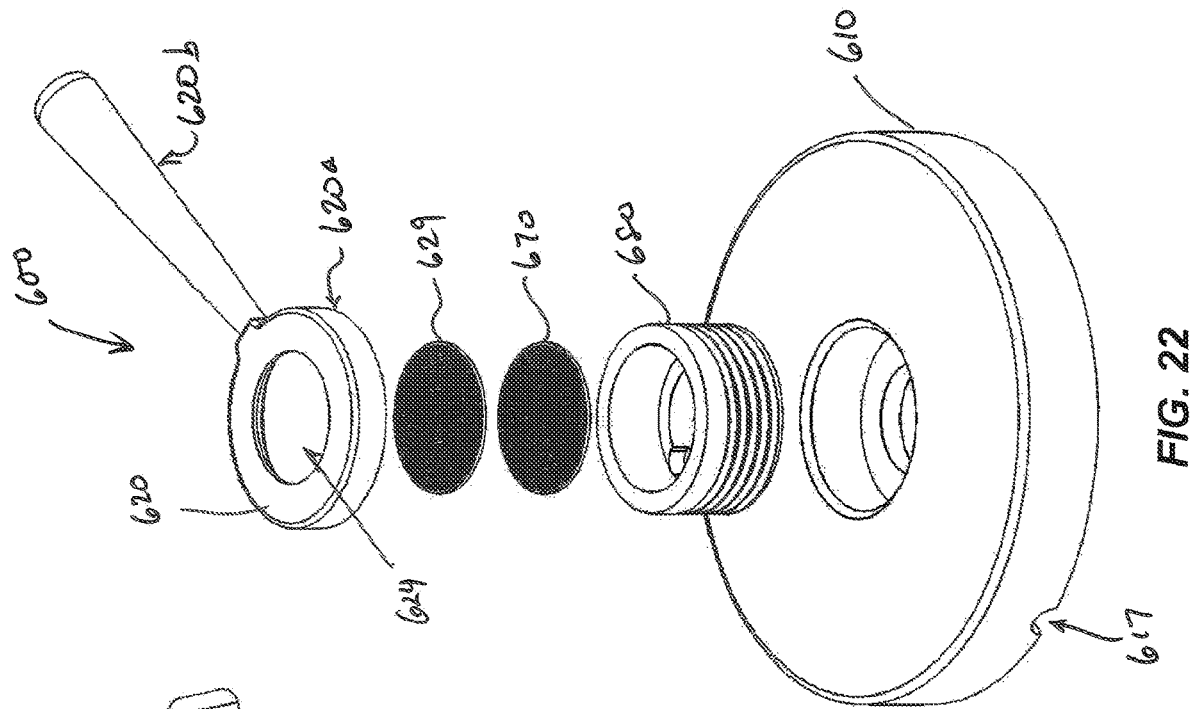
FIG. 22 is an exploded top, front perspective view of a fifth exemplary embodiment of the smoker of FIG. 21.
Figure 23:
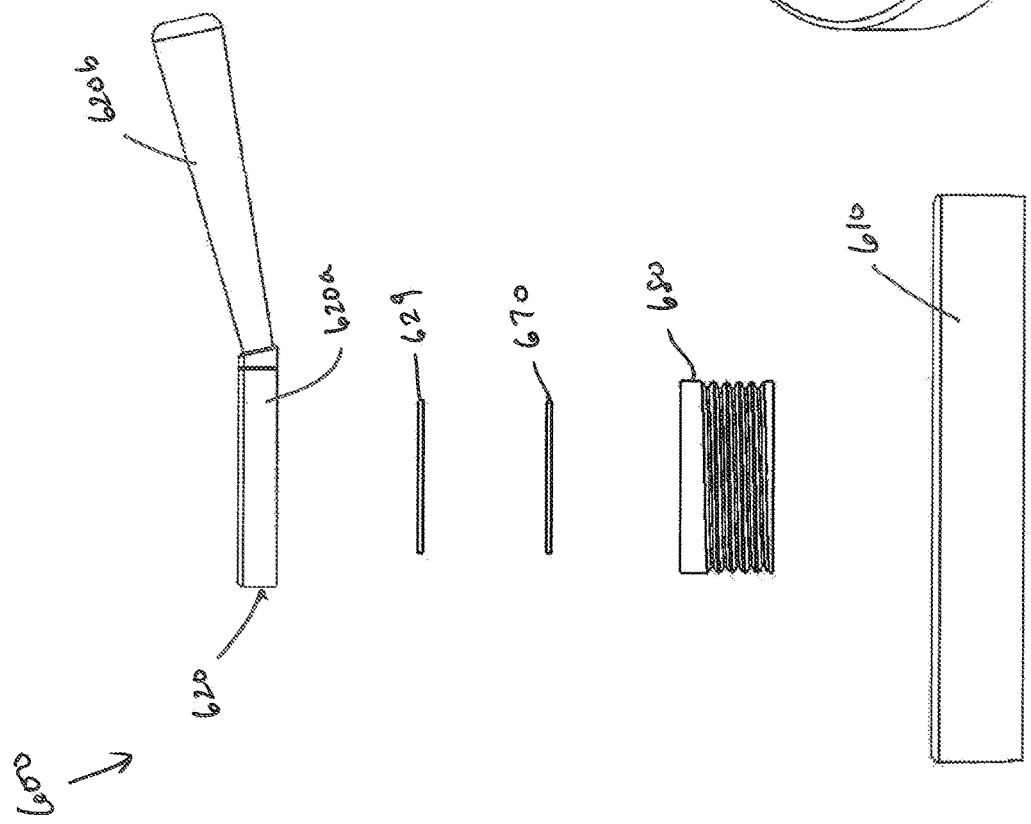
FIG. 23 is an exploded side view of the exemplary smoker of FIG. 21.
Figures 24, 25:
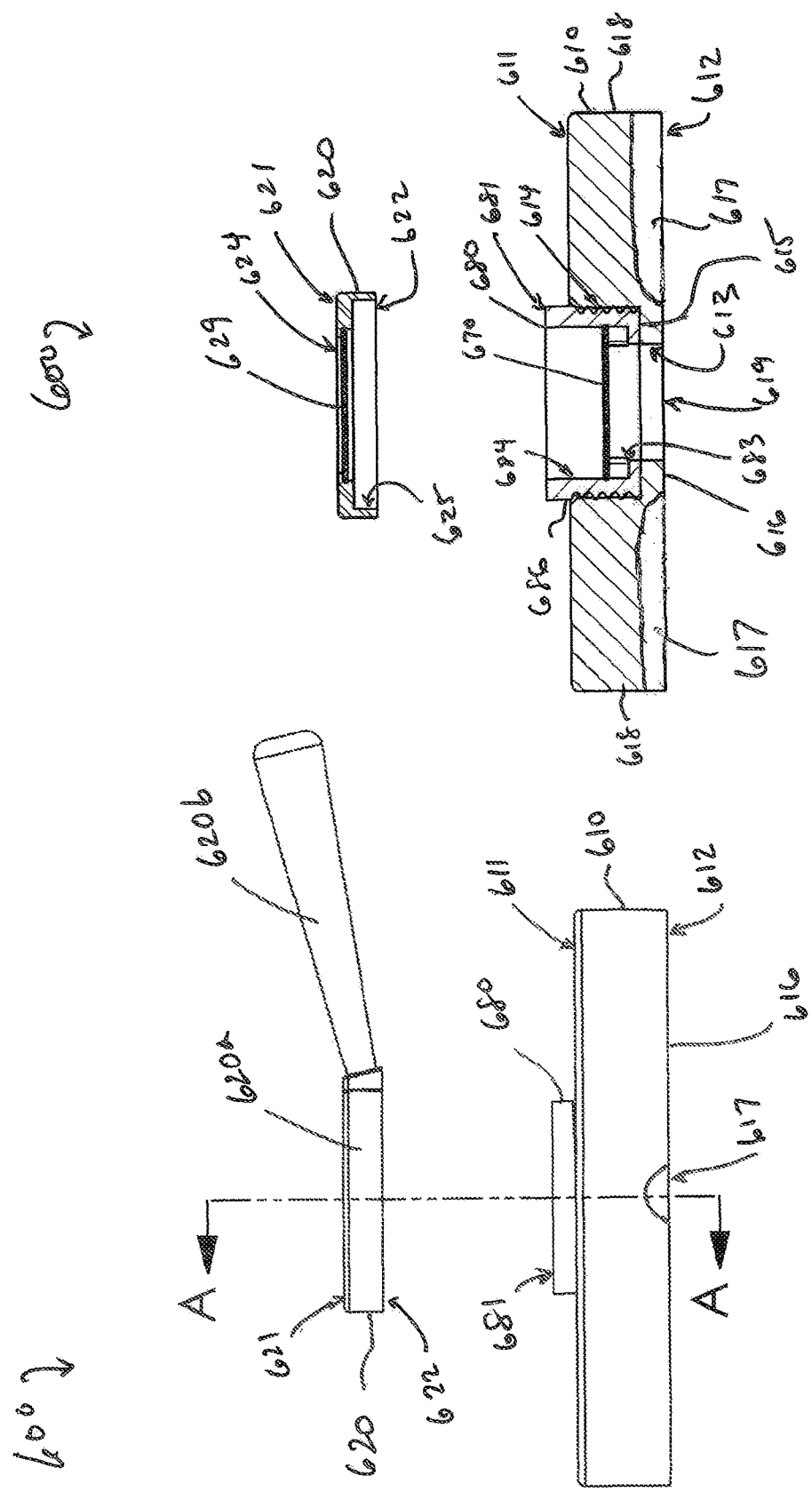
FIG. 24 is a side view of the smoker of FIG. 21 in a partially assembled configuration.
FIG. 25 is a side cross-sectional view of the partially assembled smoker of FIG. 24.
Figure 27B:
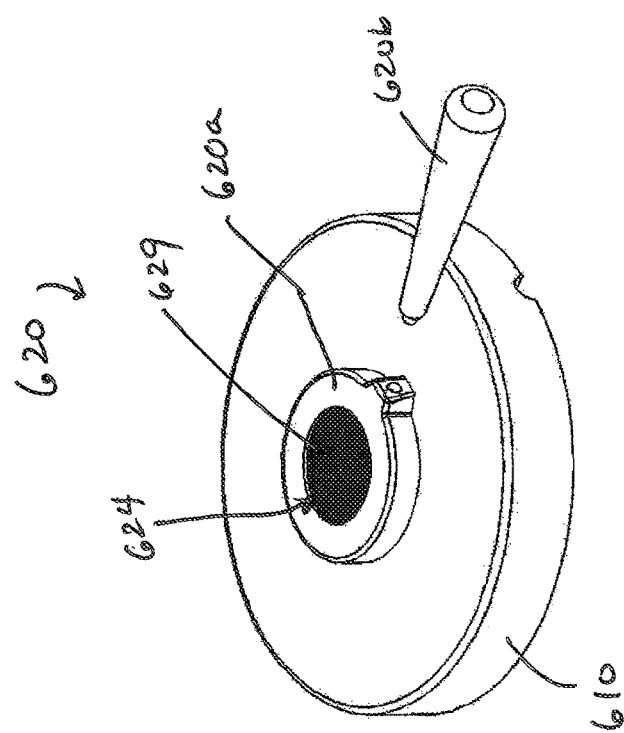
FIG. 27B is a perspective view of the smoker of FIG. 21 with the handle portion detached from the bowl portion of the top portion.
Figure 27A:
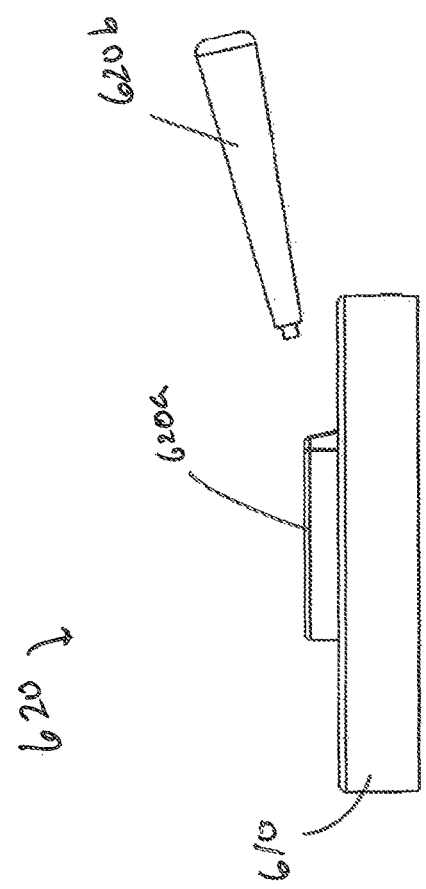
FIG. 27A is a side view of the smoker of FIG. 21 with the handle portion detached from the bowl portion of the top portion.

Referring now to FIGS. 18-20, a fourth exemplary embodiment of a smoker 500 includes the exterior visual appearance of the smoker 100 illustrated in FIGS. 1 and 2. As shown in FIGS. 18 and 19, the smoker includes a base portion 510, a top portion 520, and a mesh screen 570.

The top portion 520 includes a first end 521 and an opposite second end 522. The top portion 520 includes a through bore 523 extending from the first end 521 to the second end 522. The base portion 510 includes a first end 511 and an opposite second end 512. The base portion 510 includes a through bore 513 extending from the first end 511 to the second end 512. At the first end 511 of the base portion 510, the through bore 513 includes a first enlarged diameter bore portion 534 and a second enlarged diameter portion 514. The second enlarged diameter portion 514 and the through bore 513 are configured to cooperate to define an annular shelf 515 configured to receive the mesh screen 570 thereon. The mesh screen 570 may be press fit into the through bore 513, for example, or the mesh screen 570 may be held by the base portion 510 in any other manner.

The first enlarged diameter bore portion 534 has an inner diameter greater than an inner diameter of the second enlarged diameter portion 514. As such, the first enlarged diameter portion 534 and the second enlarged diameter portion 514 are configured to cooperate to define an annular shelf 535 that is sized such that the second end 522 of the top portion 520 is configured to be inserted into the first enlarged diameter portion 534 and received on the annular shelf 535 in an assembled configuration of the smoker 500, as shown in FIG. 20.

As would be understood by persons skilled in the art, the top surface 511 of the base portion 510 may include a raised rim in place of the first enlarged diameter portion 534. The raised rim may define an inner diameter similar to the inner diameter of the first enlarged diameter portion 534 such that the second end 522 of the top portion 520 may be configured to be inserted into the raised rim and rest on the top surface 511 of the base portion. In both of the aforementioned embodiments of the base portion 510 and the top portion 520, the structural arrangements are configured to maintain relative positioning between the base portion 510 and the top portion 520 in the assembled configuration. Of course, the previously described structural arrangements for maintaining relative position between the base portion 510 and the top portion 520 may be reversed; that is, the structures on the top surface 511 of the base portion 510 may be provided at the second end 522 of the top portion 520, and the structure at the second end 522 of the top portion 520 may be provided on the base portion 510.

The second enlarged diameter bore portion 514 of the through bore 513 and the second end 522 of the top portion 520 are configured to cooperate to define a chamber 588 configured to receive wood chips placed on the mesh screen 570. The through bore 513 of the base portion 510 is configured to provide a fluid passage from the chamber 588 out through an opening 519 in a planar bottom surface 516 of the base portion 510.

The planar bottom surface 516 includes two grooves 517 that extend from an outer wall 518 of the base portion 510 inward toward the through bore 513. However, the grooves 517 end short of the through bore 513 such that the grooves 517 do not fluidly communicate with the through bore 513. As illustrated, the outer wall 518 of the base portion 510 is circular and the grooves 517 extend radially inward. As shown, in some embodiments, the base portion 510 may include two diametrically arranged grooves 517, but in other embodiments may include one groove or more than two grooves.

As illustrated in other embodiments, the base portion 510 is sized and configured such that the bottom surface 516 sits on the rim of the container 190 such as, for example, a cocktail glass, a plastic container or cup, a glass jar or bottle, or the like. The rim of the container 190 should be sized larger than the diameter of the opening of the through bore 513 and smaller than the diameter of the outer wall 518 of the base portion 510 such that the through bore 513 and the grooves 517 fluidly communicate with the interior volume of the container 190. Otherwise, the bottom surface 516 cooperates with the rim of the container 190 to provide a barrier to smoke or air exiting the container 190. Use of the smoker 500 is described in more detail below.

Figure 28A:
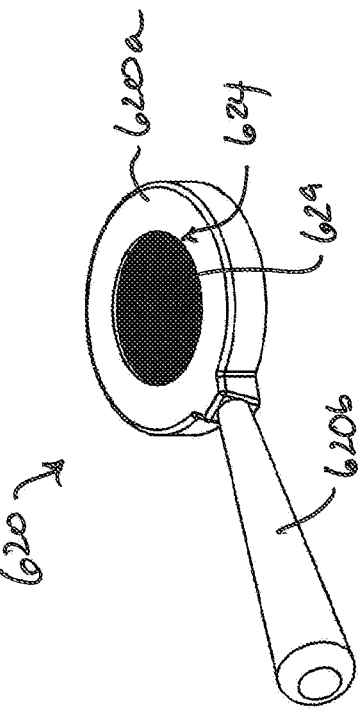
FIG. 28A is a side view of the top portion of the smoker of FIG. 21.
Figure 28B:
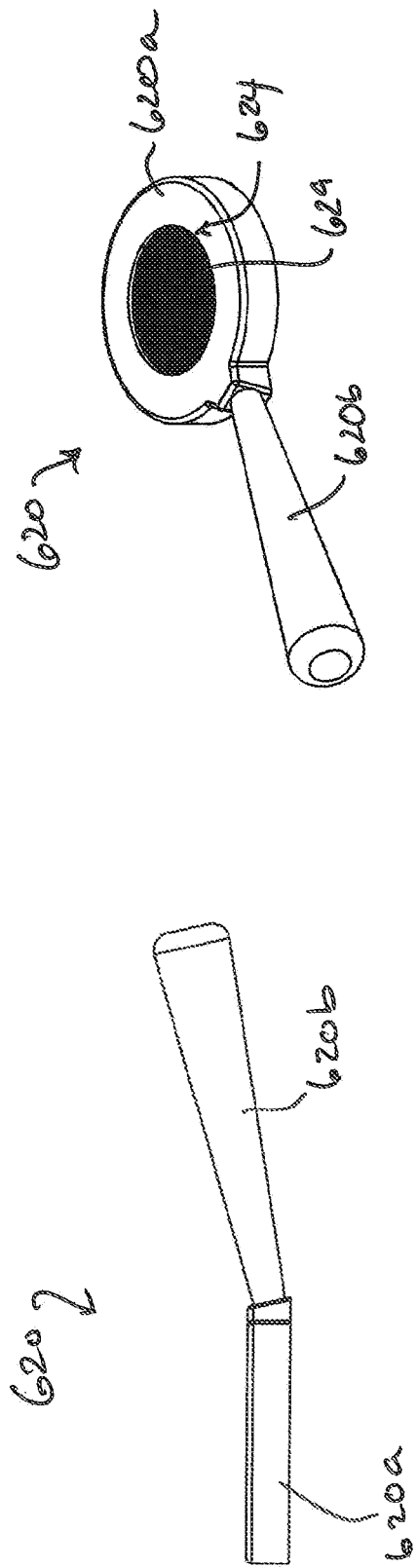
FIG. 28B is a top perspective view of the top portion of the smoker of FIG. 21
Figure 28C:
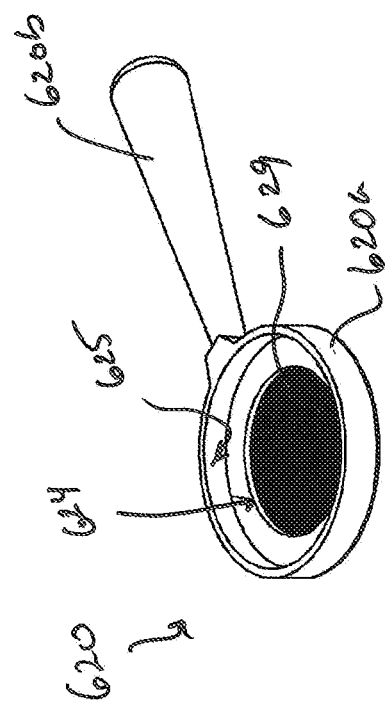
FIG. 28C is a bottom perspective view of the top portion of the smoker of FIG. 21.
Figure 29:
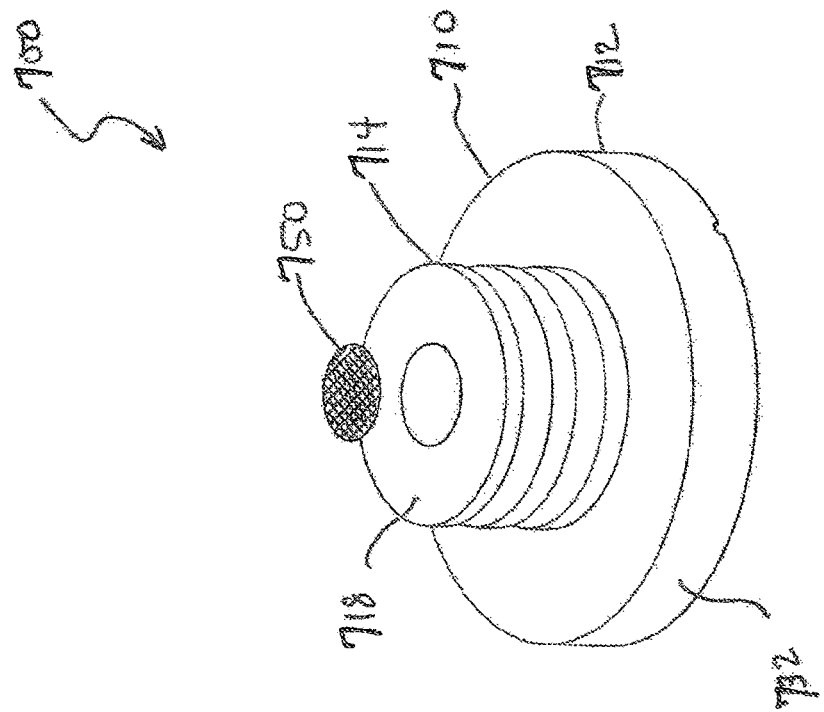
FIG. 29 is an exploded top, front perspective view of an exemplary smoker in accordance with various aspects of the disclosure.
Figure 30:
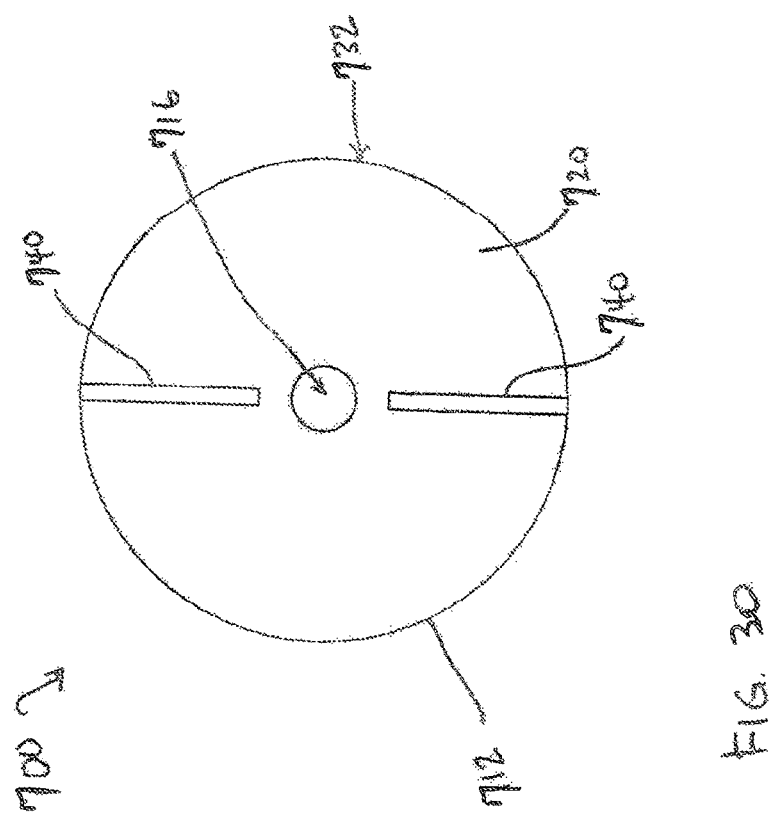
FIG. 30 is a bottom view of the smoker of FIG. 29.

Referring now to FIGS. 21-28C, a fifth exemplary embodiment of a smoker 600 includes a base portion 610 and a top portion 620. The smoker 600 further includes a first mesh screen 629, a second mesh screen 670, and an insert 680. As best shown in FIG. 28C, the top portion 620, or topper, may be configured as a spoon having a bowl portion 620a and a handle portion 620b. The bowl portion 620a may have a volume selected such that the bowl portion 620a may serve as a measuring spoon for providing a desired amount of wood chips into the smoker, as will be described below.

As illustrated, the bowl portion 620a includes a first end 621 and an opposite second end 622. The first end 621 of the bowl portion 620a includes an opening 624 configured to receive and retain the first mesh screen 629 by a press fit or any other means. The second end 622 is configured to be placed on a top surface 612 of the base portion 610 in an assembled configuration of the smoker 600, as will be described in more detail below.

The base portion 610 includes a first end 611 and an opposite second end 612. The base portion 610 includes a through bore 613 extending from the first end 611 to the second end 612. At the first end 611 of the base portion 610, the through bore 613 includes an enlarged diameter bore portion 614 configured to receive at least a portion of the insert 680 therein. The enlarged diameter portion 614 and the through bore 613 are configured to cooperate to define an annular shelf 615.

The insert 680 includes a first end 681, a second end 682, and a through bore 683 extending from the first end 681 to the second end 682. At the first end 681, the through bore 683 includes an enlarged diameter bore portion 684 having an inner diameter greater than an outer diameter of the mesh screen 670 and being configured to receive the mesh screen 670 therein. The enlarged diameter portion 684 and the through bore 683 are configured to cooperate to define a shelf 685 configured to receive the mesh screen 670 thereon. It should be understood that the shelf may include notches to accept a tool designed to thread the insert 680 into the base portion 610.

The insert 680 may include an outer wall 686 having a threaded portion 687 at the second end 682 and extending at least part of the way toward the first end 681. The threaded portion 687 is configured to be threadedly received by the enlarged diameter bore portion 614 of the base portion 610. The annular shelf 615 may act as a stop to limit the depth to which the insert 680 can be threaded into the enlarged diameter bore portion 684.

The enlarged diameter bore portion 684 of the insert 680 and the spoon portion 620a are configured to cooperate to define a chamber 688 configured to receive wood chips placed on the mesh screen 670. The through bore 683 of the insert 680 and the through bore 613 of the base portion 610 are configured to provide a fluid passage from the chamber 688 out through an opening 619 in a planar bottom surface 616 of the base portion 610.

The planar bottom surface 616 includes two grooves 617 that extend from an outer wall 618 of the base portion 610 inward toward the through bore 613. However, the grooves 617 end short of the through bore 613 such that the grooves 617 do not fluidly communicate with the through bore 613. As illustrated, the outer wall 618 of the base portion 610 is circular and the grooves 617 extend radially inward. As shown, in some embodiments, the base portion 610 may include two diametrically arranged grooves 617, but in other embodiments may include one groove or more than two grooves.

As illustrated in other embodiments, the base portion 610 is sized and configured such that the bottom surface 616 sits on the rim of a container 190 such as, for example, a cocktail glass, a plastic container or cup, a glass jar or bottle, or the like. The rim of the container 190 should be sized larger than the diameter of the opening of the through bore 613 and smaller than the diameter of the outer wall 618 of the base portion 610 such that the through bore 613 and the grooves 617 fluidly communicate with the interior volume of the container 190. Otherwise, the bottom surface 616 cooperates with the rim of the container 190 to provide a barrier to smoke or air exiting the container 190.

To assemble the base portion 610 of the smoker 600, the threaded portion 687 of the insert 680 may be threaded into the enlarged diameter bore portion 614 of the base portion 610, and the mesh screen 670 may be inserted into the insert 680 to rest on the shelf 685 by a press fit or any other means.

The second enlarged diameter bore portion 625 of the top portion 620 may have an inner diameter that is greater than an outer diameter of the insert 680 such that a portion of the insert 680 extending from the first end 611 of the base portion 610 can be received in the second enlarged diameter bore portion 625 of the top portion 620 when the top assembly 602 is placed onto the base assembly 614. Use of the smoker 600 is described in more detail below.

It should be appreciated that any or all of the aforementioned smokers 200, 300, 400 may optionally include a lid, for example, configured to be received on the first end 221, 321, 421 of the top portion 220, 320, 420 of the smoker. The lid may be wood or any food grade material that can withstand the heat generated by, for example, a torch lighter that is used to burn wood chips placed in the chamber 288, 388, 488 and ignited by the torch lighter. The optional lid is configured to be placed on a top surface 226, 326, 426 of the top portion 220, 320, 420 of the smoker 200, 300, 400 to cover the opening to the chamber 288, 388, 488 to (i) extinguish burning wood chips, shavings, or combustible material in the chamber 288, 388, 488, (ii) block the flow of air from the container 190 via the opening, and (iii) keep smoke in the container 190.

In use, wood chips, shavings, or other combustible material (not shown) are placed in the chamber 288, 388, 488 on the mesh insert 270, 370, 470. The top assembly 202, 302, 402 is placed on the bottom assembly 204, 304, 404 such that a portion of the insert 280 extending from the first end 211 of the base portion 210 is received in the second enlarged diameter bore portion 225 of the top portion 220 when the top assembly 202 is placed onto the base assembly 214. The wood chips are then burned with a lighter (not shown), for example, a torch lighter, that is held to direct a flame into the through hole 233 of the inlet reducer 230 and toward the wood chips in the chamber 288, 388, 488. The smoker 200, 300, 400 then directs smoke generated by the burning wood chips, shaving, or other combustible material to travel out of the opening 219, 319, 419 the base portion 210, 310, 410 into the container 190. Meanwhile, the grooves 217, 317, 417 permit air in the container 190 to be displaced by the smoke entering the container and to exit the container 190 via the grooves 217, 317, 417, thereby equalizing the air pressure in the container 190 with the air pressure outside of the container 190. The smoke entering the container 190 comes into contact with the walls of the container 190 and the contents (e.g., ice and/or liquid) of the container 190. The molecules in the smoke dissolve in moisture on the container 190 and its contents, thereby imparting the smell and taste of the smoke to the beverage or food being served in the container 190.

Referring now to FIGS. 29-32, an exemplary embodiment of a smoker 700 in accordance with various aspects of the disclosure includes a body member 710 and a mesh insert 750. The body member 710 includes a base portion 712 and a top portion 714. In various aspects, the body member 710 is a monolithic structure of unitary construction. In some aspects, the base portion 712 and the top portion 714 can be separate structures that are secured together via any conventional means. The body member 710 may be wood or any food grade material that can withstand the heat generated by, for example, a torch lighter that is used to burn wood chips stored in a chamber of the top portion 714 and ignited by the torch lighter, as discussed in more detail below.

Figure 32:
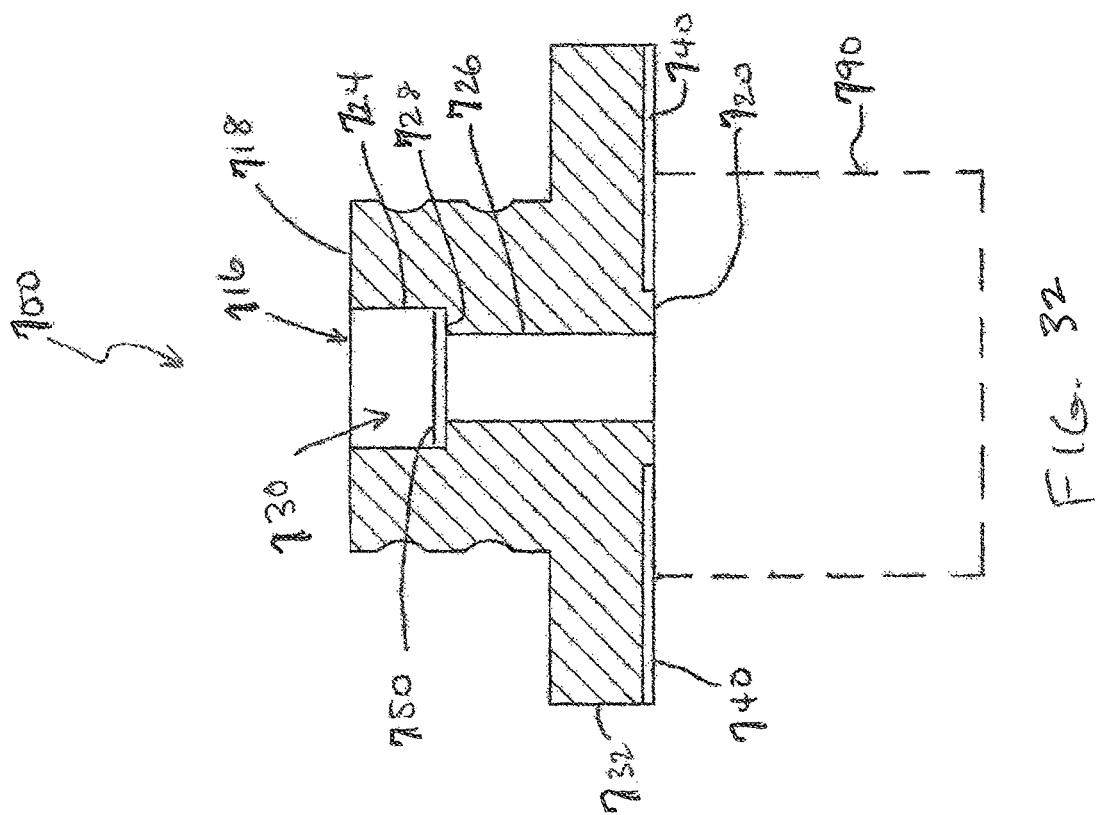
FIG. 32 is a side cross-sectional view of the smoker of FIG. 29 taken along A-A of FIG. 31.
Figure 31:
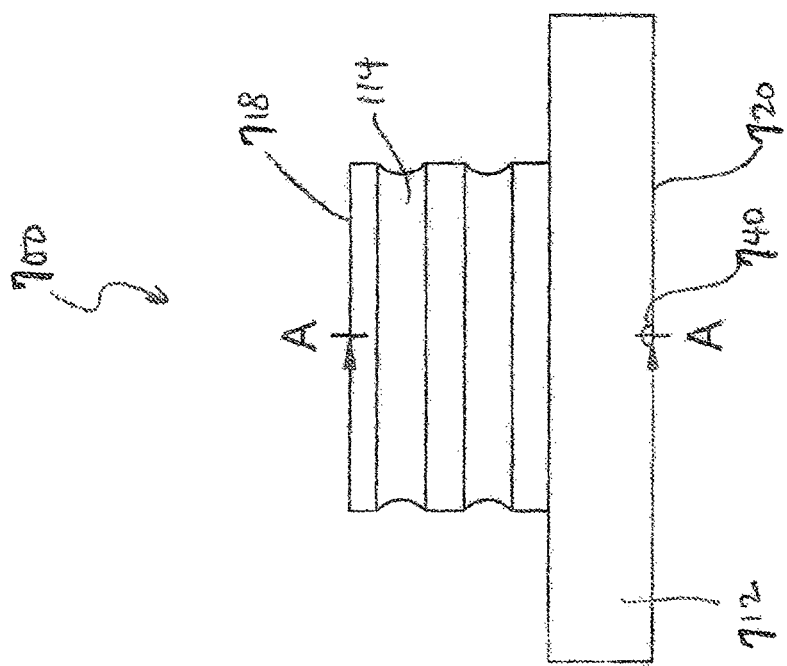
FIG. 31 is a side view of the smoker of FIG. 29.
Figure 34:
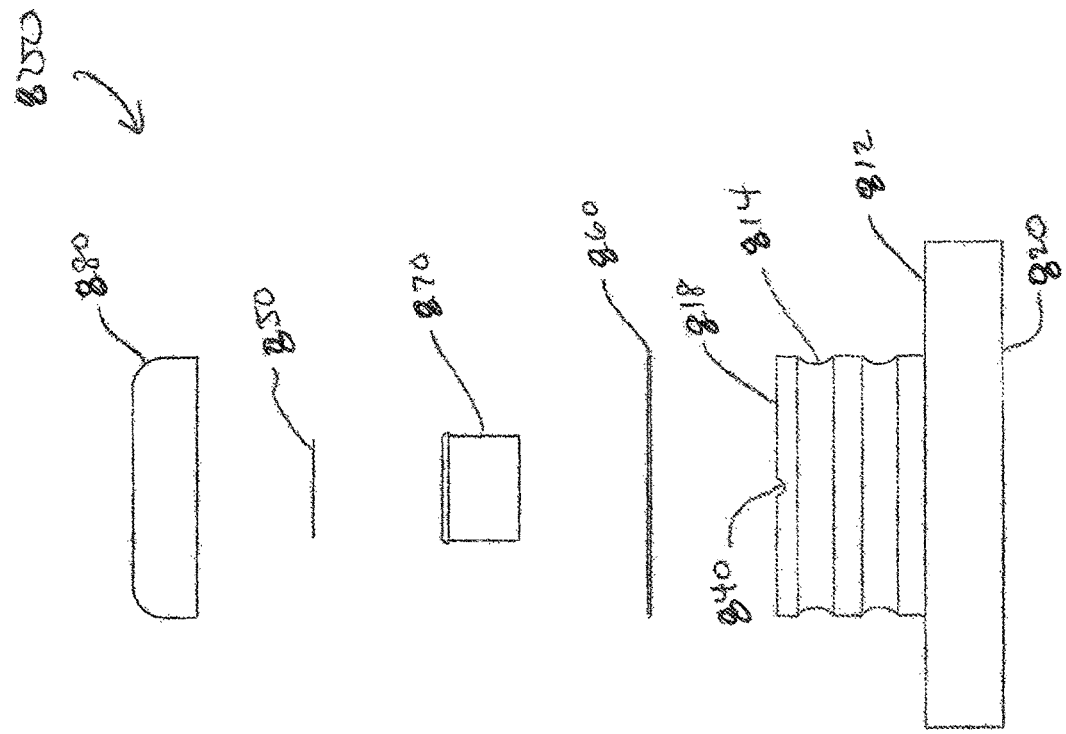
FIG. 34 is an exploded side view of the smoker of FIG. 33.
Figure 33:
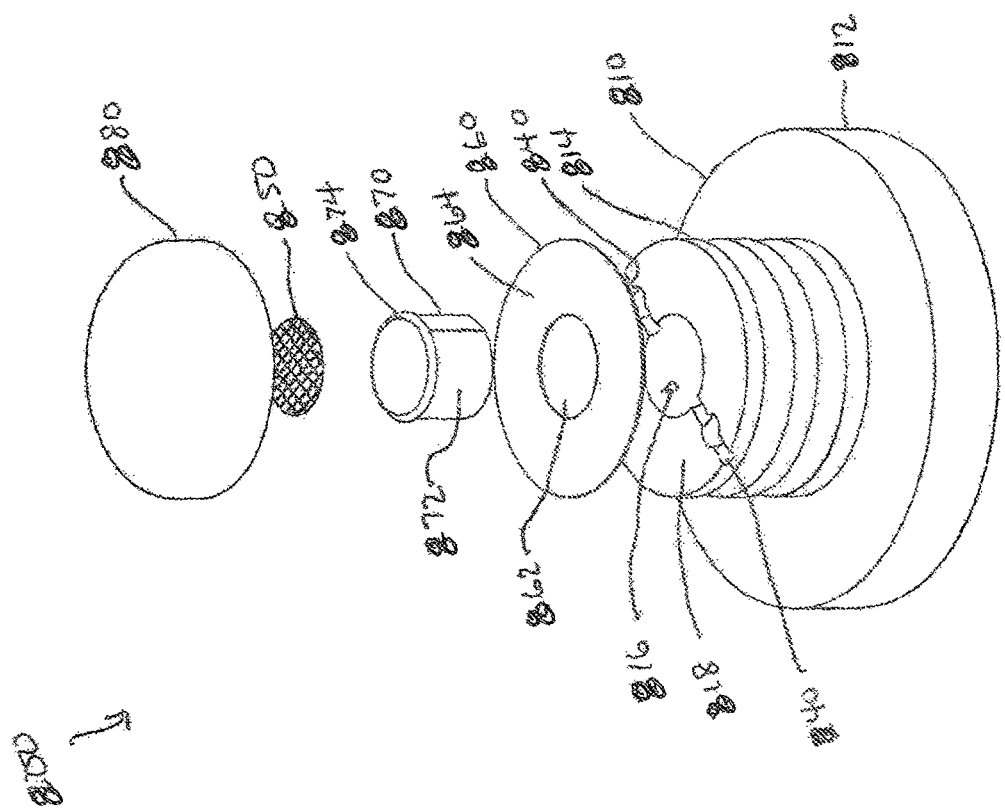
FIG. 33 is an exploded top, front perspective view of another exemplary smoker in accordance with various aspects of the disclosure.

As shown in FIG. 32, the body member 710 includes a through bore 716 extending from a top surface 718 of the top portion 714 to a bottom surface 720 of the base portion 712. The through bore 716 has a first bore portion 724 extending from the top surface 718 into the top portion 714, and a second bore portion 726 extending from the first bore portion 724 to the bottom surface 720. The first bore portion 724 has an inside diameter that is greater than an inside diameter of the second bore portion 726, thus defining a shoulder or shelf 728 at the interface of the first bore portion 724 and the second bore portion 726.

The first bore portion 724 is sized such that the mesh insert 750 can be received in the first bore portion 724, and the second bore portion 726 is sized such that the mesh insert cannot be inserted into the second bore portion 726. As illustrated, the mesh insert 750 is configured to be disposed above the shoulder 728. The mesh insert 750 and the first bore portion 724 define a chamber 730 configured to received wood chips, wood shaving, or other combustible material. The mesh insert 750 may be stainless steel or any food grade material that can withstand the heat generated by, for example, a torch lighter that is used to burn wood chips stored in a chamber of the top portion 714 and ignited by the torch lighter.

The bottom surface 720 of the base portion 712 is flat and includes two grooves 740 that extend from an outer wall 732 of the base portion 712 inward toward the second bore portion 726. However, the grooves 740 end short of the second bore portion 726 such that the grooves 740 do not fluidly communicate with the second bore portion 726. As illustrated, the outer wall 732 of the base portion 712 is circular and the grooves 740 extend radially inward.

As shown in FIG. 32, the base portion 712 is sized and configured such that the bottom surface 720 sits on the rim of a container 790 such as, for example, a cocktail glass, a plastic container or cup, a glass jar or bottle, or the like. The rim of the container 790 should be sized larger than the diameter of the opening of the second bore portion 726 and smaller than the diameter of the outer wall 732 of the base portion 712 such that the second bore portion 726 and the grooves 740 fluidly communicate with the interior volume of the container 790. Otherwise, the bottom surface 720 cooperates with the rim of the container 790 to provide a barrier to smoke or air exiting the container 790.

It should be appreciated that the smoker 700 may optionally include a lid such as the lid 880 illustrated in FIGS. 33-36. The lid may be wood or any food grade material that can withstand the heat generated by, for example, a torch lighter that is used to burn wood chips stored in a chamber of the top portion 714 and ignited by the torch lighter. The optional lid is configured to be placed on the top surface 718 of the top portion 714 of the body member 710 to cover the through bore 716 so as to (i) extinguish burning wood chips, shavings, or combustible material in the chamber 730, (ii) block the flow of air from the container 790 via the through bore 716, and (iii) keep smoke in the container 790.

In use, when wood chips, shavings, or other combustible material (not shown) are placed in the chamber 730 on the mesh insert 750 and burned with a lighter (not shown), for example, a torch lighter, the smoker 700 permits smoke generated by the burning wood chips, shaving, or other combustible material to travel through the second bore portion 726 and out of the base portion 712 into the container 790. Meanwhile, the grooves 740 permit air in the container 790 to be displaced by the smoke and exit the container 790 via the grooves 740, thereby equalizing the air pressure in the container 790 with the air pressure outside of the container 790. The smoke entering the container 790 comes into contact with the walls of the container 790 and the contents (e.g., ice and/or liquid) of the container 790. The molecules in the smoke dissolve in moisture on the container 790 and its contents, thereby imparting the smell and taste of the smoke to the beverage or food being served in the container 790.

Referring now to FIGS. 33-36, another an exemplary embodiment of a smoker 800 in accordance with various aspects of the disclosure is illustrated. The smoker 800 includes a body member 810, a mesh insert 850, a washer 860, and a cylinder 870. Optionally, the smoker 800 may include a lid 880. The body member 810 includes a base portion 812 and a top portion 814. In various aspects, the body member 810 is a monolithic structure of unitary construction. The body member 810 may be wood or any food grade material that can withstand the heat generated by, for example, a torch lighter that is used to burn wood chips stored in a chamber of the top portion 814 and ignited by the torch lighter, as discussed in more detail below.

Figure 36:
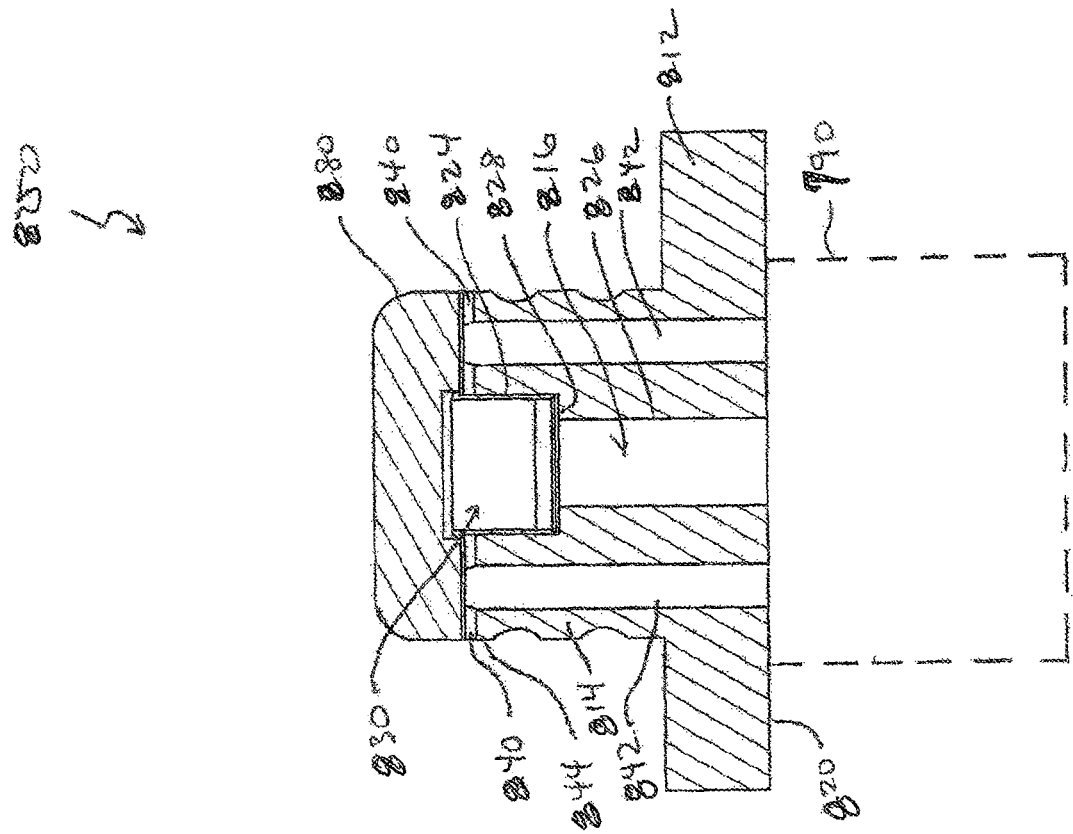
FIG. 36 is a side cross-sectional view of the smoker of FIG. 33 taken along B-B of FIG. 35.
Figure 35:
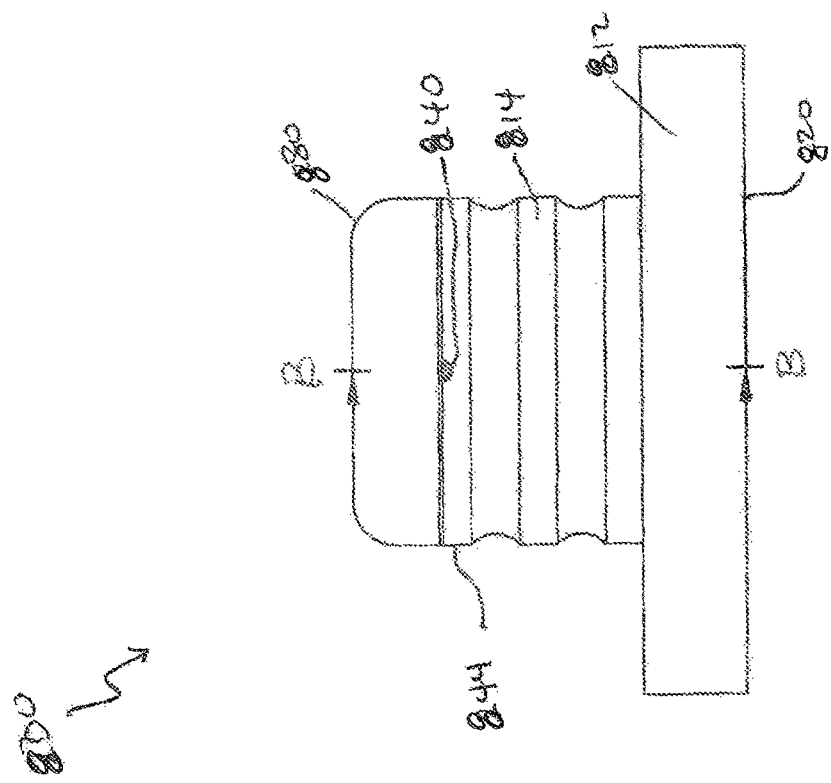
FIG. 35 is a side view of the smoker of FIG. 33.

As shown in FIG. 36, the body member 810 includes a through bore 816 extending from a top surface 818 of the top portion 814 to a bottom surface 820 of the base portion 812. The through bore 816 has a first bore portion 824 extending from the top surface 818 into the top portion 814, and a second bore portion 826 extending from the first bore portion 824 to the bottom surface 820. The first bore portion 824 has an inside diameter that is greater than an inside diameter of the second bore portion 826, thus defining a shoulder or shelf 828 at the interface of the first bore portion 824 and the second bore portion 826.

The top surface 818 of the top portion 814 is flat and includes two grooves 840 that extend radially outward from the first bore portion 824 to the outer wall 844 of the top portion 814. As illustrated, the outer wall 844 of the top portion 814 is circular at the top surface 818, and the grooves 840 extend radially. The body member 810 includes exit through bores 842 extending from the top surface 818 of the top portion 814 to the bottom surface 820 of the base portion 812. The exit through bores 842 are radially offset from the through bore 816 in diametrically opposite directions.

The first bore portion 824 is sized such that the cylinder 870, for example, a stainless steel cylinder, can be received in the first bore portion 824. The cylinder 870 may include a knurled outer surface 872 for gripping the interior wall of the first bore portion 824 in a friction fit relationship. The washer 860, for example, a stainless steel washer, is sized to match the top surface 818 of the top portion 814. The washer 860 includes a center opening 862 sized to permit the cylinder 870 be inserted into the washer 860. The cylinder 870 includes a lip 874 at a top end that prevents the cylinder 870 from being inserted completely through the washer 860. Instead, the cylinder 870 is configured to be inserted into the washer 860 until the lip 874 meets a top surface 864 of the washer 860.

The cylinder 870 has an inside diameter sized such that the mesh insert 850 can be inserted into the cylinder 870. The bottom end of the cylinder 870 may include a radially inward lip that provides a shoulder or shelf (not shown) upon which the mesh insert 850 can rest. The second bore portion 826 is sized such that the mesh insert 850 cannot be inserted into the second bore portion 826 in the event that the mesh insert 850 is inadvertently pushed through the cylinder 870. The mesh insert 850 and the cylinder 870 define a chamber 830 configured to received wood chips, wood shaving, or other combustible material. The mesh insert 850 may be stainless steel or any food grade material that can withstand the heat generated by, for example, a torch lighter that is used to burn wood chips stored in a chamber of the top portion 814 and ignited by the torch lighter.

As shown in FIG. 36, the base portion 812 is sized and configured such that the bottom surface 820 sits on the rim of a container 790 such as, for example, a cocktail glass, a plastic container or cup, a glass jar or bottle, or the like. The rim of the container 790 should be sized larger than the distance between the radially outer surfaces of the exit through bores 842 such that the second bore portion 826 and the exit through bores 842 fluidly communicate with the interior volume of the container 790. Otherwise, the bottom surface 820 is flat and configured to cooperate with the rim of the container 790 to provide a barrier to smoke or air exiting the container 790.

In use, when wood chips, shavings, or other combustible material (not shown) are placed in the chamber 830 on the mesh insert 850 and burned with a lighter (not shown), for example, a torch lighter, the smoker 800 permits smoke generated by the burning wood chips, shaving, or other combustible material to travel through the second bore portion 826 and out of the base portion 812 into the container 890. Meanwhile, the exit through bores 842 permit air in the container 890 to be displaced by the smoke and exit the container 790 via the through bores 842, thereby equalizing the air pressure in the container 790 with the air pressure outside of the container 790. The smoke entering the container 790 comes into contact with the walls of the container 790 and the contents (e.g., ice and/or liquid) of the container 790. The molecules in the smoke dissolve in moisture on the container 790 and its contents, thereby imparting the smell and taste of the smoke to the beverage or food being served in the container 790.

The optional lid 880 may be wood or any food grade material that can withstand the heat generated by, for example, a torch lighter that is used to burn wood chips stored in a chamber of the top portion 814 and ignited by the torch lighter. The optional lid 880 is configured to be placed on the top surface 818 of the top portion 814 of the body member 810 to cover the through bore 816 so as to (i) extinguish burning wood chips, shavings, or combustible material in the chamber 830, (ii) block the flow of air from the container 790 via the through bore 816, and (iii) keep smoke in the container 790.

It should be appreciated that the smoker 800 may include a through bore 816 having first and second bore portions 824, 826 having the same diameter, and the cylinder 870 can be configured to prevent the insert 850 from moving into the second bore portion 826. Similarly, the smoker 700 may include a through bore 716 having first and second bore portions 724, 726 having the same diameter, and the through bore 716 may include a radial ridge or other structure configured to prevent the insert 750 from moving into the second bore portion 726.

The accompanying figures illustrate various exemplary embodiments of smokers in accordance with the disclosure. Although certain embodiments of the present invention are shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of embodiments of the present invention.

What is claimed is:

1. A smoker for infusing smoke flavor and/or taste into a beverage or food, the smoker comprising:

a body member having a through bore extending from a first end of the body member to an opposite second end of the body member in a first direction; and an insert configured to be received in the through bore at the first end and retained by the through bore at a position between the first end and the second end, wherein the through bore and the insert are configured to define a chamber for receiving a combustible material between the insert and the first end, wherein the through bore is configured to permit a flow of smoke from the combustible material out the through bore at the second end of the body member, wherein the second end of the body member is configured to rest on a rim of a container to block the flow of air from the container where a surface of the second end of the body member contacts the rim, wherein the body member includes a groove in the surface of the second end, and wherein the groove extends in a second direction perpendicular to the first direction of the through bore from an outer periphery of the second end to a position spaced from the through bore, and wherein the second end of the body member is sized and configured to be placed on the rim of the container such that each groove crosses the rim of the container to permit air to flow from inside the container to outside the container via the groove.

2. The smoker of claim 1, wherein the through bore includes a first bore portion adjacent the first end of the body member and a second bore portion adjacent the second end of the body member, and wherein the first bore portion has an inside diameter that is greater than an inside diameter of the second bore portion.

3. The smoker of claim 2, wherein an interface of the first bore portion and the second bore portion defines a shoulder configured to retain the insert in the first bore portion.

4. The smoker of claim 2, wherein the inside diameter of the second bore portion is smaller than an outside diameter of the insert such that the second bore portion is configured to prevent the mesh insert from passing into the second bore portion.

5. The smoker of claim 1, wherein the body member includes two of said grooves in the surface of the second end, and wherein the grooves extend in a second direction perpendicular to the first direction of the through bore from an outer periphery of the second end to positions spaced from the through bore.

6. The smoker of claim 1, further comprising a lid configured to be placed on a surface of the first end of the body member to cover the through bore so as to block the flow of air from the container via the through bore.

7. The smoker of claim 1, wherein the body member is a single monolithic piece of unitary construction.

8. A smoker for infusing smoke into flavor and/or taste of a beverage or food, the smoker comprising:

a body member having a through bore extending from a first end of the body member to an opposite second end of the body member in a first direction; and an insert configured to permit smoke to pass therethough;

wherein the through bore has opposing open ends along a longitudinal axis, wherein the through bore is configured to receive the insert via the first end and to retain the insert at a position between the first end and the second end, wherein the through bore and the insert are configured to define a chamber for receiving a combustible material between the insert and the first end, wherein the through bore is configured to permit a flow of smoke from the combustible material out the through bore at the second end of the body member, and wherein the second end of the body member is sized and configured to rest on a rim of a container to block the flow of air from the container where a surface of the second end of the body member contacts the rim.

9. The smoker of claim 8, wherein the body member includes a groove in the surface of the second end, and wherein the groove extends in a second direction perpendicular to the first direction of the through bore from an outer periphery of the second end to a position spaced from the through bore, and wherein the groove is configured to cross the rim of the container and to provide a portion of the second end of the body member that avoids contact with the rim to provide a passage for air to flow from inside the container to outside the container via the groove.

10. The smoker of claim 9, wherein the groove includes two grooves in the surface of the second end, and wherein the grooves extend in a second direction perpendicular to the first direction of the through bore from an outer periphery of the second end to positions spaced from the through bore.

11. The smoker of claim 9, wherein the through bore includes a first bore portion adjacent the first end of the body member and a second bore portion adjacent the second end of the body member, and wherein the first bore portion has an inside diameter that is greater than an inside diameter of the second bore portion.

12. The smoker of claim 11, wherein an interface of the first bore portion and the second bore portion defines a shoulder configured to retain the insert in the first bore portion.

13. The smoker of claim 11, wherein the inside diameter of the second bore portion is smaller than an outside diameter of the insert such that the second bore portion is configured to prevent the mesh insert from passing into the second bore portion.

14. The smoker of claim 8, wherein the through bore includes a first bore portion adjacent the first end of the body member and a second bore portion adjacent the second end of the body member, wherein the first bore portion has an inside diameter that is greater than an inside diameter of the second bore portion such that the cylinder is configured to be disposed in the first bore portion, and wherein the second bore portion is configured to prevent the cylinder from entering the second bore portion.

15. The smoker of claim 14, wherein the inside diameter of the second bore portion is smaller than an outside diameter of the insert such that the second bore portion is configured to prevent the mesh insert from passing into the second bore portion.

16. The smoker of claim 8, further comprising a lid configured to be placed on a surface of the first end of the body member to cover the through bore so as to block the flow of air from the container via the through bore.

17. The smoker of claim 8, wherein the body member is a single monolithic piece of unitary construction.

18. The smoker of claim 8, wherein the body member includes a groove in the surface of the second end, and wherein the groove extends in a second direction perpendicular to the first direction of the through bore from an outer periphery of the second end to a position spaced from the through bore.

19. The smoker of claim 8, wherein the body member includes a groove in the surface of the second end, and wherein the groove extends in a second direction perpendicular to the first direction of the through bore from an outer periphery of the second end toward the through bore.

20. A smoker for infusing smoke flavor and/or taste into a beverage or food, the smoker comprising:
- a body member having a through bore extending from a first end of the body member to an opposite second end of the body member in a first direction; and
- an insert configured to be received in the through bore at the first end and retained by the through bore at a position between the first end and the second end,
- wherein the through bore and the insert are configured to define a chamber for receiving a combustible material between the insert and the first end,
- wherein the through bore is configured to permit a flow of smoke from the combustible material out the through bore at the second end of the body member,
- wherein the second end of the body member is configured to rest on a rim of a container to block the flow of air from the container where a surface of the second end of the body member contacts the rim,
- wherein the body member includes a groove in the surface of the second end, and wherein the groove extends in a second direction perpendicular to the first direction of the through bore from an outer periphery of the second end toward the through bore, and
- wherein the second end of the body member is sized and configured to be placed on the rim of the container such that each groove crosses the rim of the container to permit air to flow from inside the container to outside the container via the groove.

21. The smoker of claim 20, wherein the through bore includes a first bore portion adjacent the first end of the body member and a second bore portion adjacent the second end of the body member, and wherein the first bore portion has an inside diameter that is greater than an inside diameter of the second bore portion.

22. The smoker of claim 21, wherein an interface of the first bore portion and the second bore portion defines a shoulder configured to retain the insert in the first bore portion.

23. The smoker of claim 21, wherein the inside diameter of the second bore portion is smaller than an outside diameter of the insert such that the second bore portion is configured to prevent the mesh insert from passing into the second bore portion.

24. The smoker of claim 20, wherein the body member includes two of said grooves in the surface of the second end, and
- wherein the grooves extend in a second direction perpendicular to the first direction of the through bore from an outer periphery of the second end to positions spaced from the through bore.

25. The smoker of claim 20, further comprising a lid configured to be placed on a surface of the first end of the body member to cover the through bore so as to block the flow of air from the container via the through bore.

26. The smoker of claim 20, wherein the body member is a single monolithic piece of unitary construction.

27. The smoker of claim 20, wherein the body member includes a base portion and a top portion configured to be removably coupled with one another,
- wherein the through bore includes a first through bore portion extending from a first end of the base portion to a second end of the base portion, the first through bore portion being configured to define a shelf for holding the insert between the first end and the second end, and
- wherein the through bore includes a second through bore portion extending from a first end of the top portion to an opposite second end of the top portion in a first direction.

* * * * *